United States Patent
Abotabl et al.

(10) Patent No.: US 12,512,942 B2
(45) Date of Patent: Dec. 30, 2025

(54) QUASI CO-LOCATION RELATIONSHIP INDICATIONS FOR DORMANT OR DEACTIVATED CARRIERS

(71) Applicant: QUALCOMM Incorporated, San Diego, CA (US)

(72) Inventors: Ahmed Attia Abotabl, San Diego, CA (US); Kazuki Takeda, Minato-ku (JP); Muhammad Sayed Khairy Abdelghaffar, San Jose, CA (US); Konstantinos Dimou, New York, NY (US)

(73) Assignee: QUALCOMM Incorporated, San Diego, CA (US)

( * ) Notice: Subject to any disclaimer, the term of this patent is extended or adjusted under 35 U.S.C. 154(b) by 407 days.

(21) Appl. No.: 18/064,857

(22) Filed: Dec. 12, 2022

(65) Prior Publication Data

US 2024/0195565 A1 Jun. 13, 2024

(51) Int. Cl.
*H04L 5/00* (2006.01)

(52) U.S. Cl.
CPC .......... *H04L 5/0051* (2013.01); *H04L 5/0098* (2013.01)

(58) Field of Classification Search
None
See application file for complete search history.

(56) References Cited

U.S. PATENT DOCUMENTS

| | | | |
|---|---|---|---|
| 11,889,391 B2 * | 1/2024 | Shan | ...................... H04W 12/08 |
| 2015/0341882 A1 | 11/2015 | Davydov et al. | |
| 2015/0349940 A1 | 12/2015 | Kim et al. | |
| 2020/0205131 A1 | 6/2020 | Lee et al. | |
| 2020/0413391 A1 * | 12/2020 | Luo | ...................... H04W 72/046 |
| 2021/0067979 A1 * | 3/2021 | Rahman | ................. H04L 5/0023 |
| 2021/0091827 A1 | 3/2021 | Namba et al. | |
| 2021/0168788 A1 | 6/2021 | Liu et al. | |
| 2021/0226684 A1 | 7/2021 | Koskela et al. | |
| 2021/0329546 A1 * | 10/2021 | Wang | ...................... H04W 76/15 |
| 2021/0359813 A1 * | 11/2021 | Huang | ................... H04W 24/04 |
| 2022/0085943 A1 * | 3/2022 | Zhu | ...................... H04W 56/0055 |
| 2022/0286191 A1 * | 9/2022 | Wei | ...................... H04B 7/06964 |
| 2023/0189289 A1 * | 6/2023 | Yang | ................... H04W 72/232 |
| | | | 370/329 |
| 2023/0224866 A1 * | 7/2023 | Hakola | ................... H04B 7/022 |
| | | | 370/329 |

OTHER PUBLICATIONS

International Search Report and Written Opinion—PCT/US2023/079537—ISA/EPO—Mar. 22, 2024.

* cited by examiner

*Primary Examiner* — Otis L Thompson, Jr.
(74) *Attorney, Agent, or Firm* — Kevin M. Donnelly; Holland & Hart LLP

(57) ABSTRACT

Methods, systems, and devices for wireless communication are described. A user equipment (UE) may receive a carrier indication that identifies a first carrier and a second carrier for communication between the UE and a network entity. The UE may receive a first quasi co-location (QCL) indication using the first carrier. The first QCL indication may identify a first set of QCL information that corresponds to a reference signal received using the first carrier. The UE may receive a second QCL indication using the second carrier. The second QCL indication may identify the reference signal and may indicate that the first set of QCL information is associated with signaling received using the second carrier.

26 Claims, 16 Drawing Sheets

QUASI CO-LOCATION RELATIONSHIP INDICATIONS FOR DORMANT OR DEACTIVATED CARRIERS

TECHNICAL FIELD

The following relates to wireless communication, including indicating quasi co-location (QCL) relationships for dormant and/or deactivated carriers.

DESCRIPTION OF THE RELATED TECHNOLOGY

Wireless communication systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems, which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communication system may include one or more network entities, each supporting wireless communication for communication devices, which may be known as user equipment (UE).

In some wireless communication systems, operations performed at a network entity may lead to increased power consumption and increased cost associated with the increased power consumption. To conserve power, the network entity may support secondary cell (SCell) deactivation and SCell dormancy. In some cases, the network entity may configure the UE with an anchor cell, such as a primary cell, to determine a quality of an SCell that may be (or may have previously been) deactivated or dormant. For instance, the network entity may infer (for example, determine) the quality of the deactivated or dormant SCell based on measurements performed on a reference signal transmitted using an anchor carrier associated with the anchor cell. Additionally, or alternatively, the UE may identify parameters to be used for reception of signaling transmitted using an SCell carrier associated with the SCell based on a quasi co-location (QCL) relationship between the signaling and the reference signal. In some cases, however, the network entity may be incapable of indicating the QCL relationship between the signaling and the reference signal to the UE. For instance, the network entity may lack a mechanism, much less an effective mechanism, for indicating one or more QCL relationships among signaling transmitted using carriers associated with different cells.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication. The method may include receiving a carrier indication that identifies a first carrier and a second carrier for communication between a user equipment (UE) and a network entity, receiving, using the first carrier, a first quasi co-location (QCL) indication that identifies a first set of QCL information that corresponds to a reference signal received using the first carrier, and receiving, using the second carrier, a second QCL indication that identifies the reference signal and that indicates that the first set of QCL information is associated with signaling received using the second carrier.

Another innovative aspect of the subject matter described in this disclosure can be implemented in an apparatus for wireless communication. The apparatus may include a processor, memory coupled with the processor, and instructions stored in the memory. The instructions may be executable by the processor to cause the apparatus to receive a carrier indication that identifies a first carrier and a second carrier for communication between a UE and a network entity, receive, using the first carrier, a first QCL indication that identifies a first set of QCL information that corresponds to a reference signal received using the first carrier, and receive, using the second carrier, a second QCL indication that identifies the reference signal and that indicates that the first set of QCL information is associated with signaling received using the second carrier.

Another innovative aspect of the subject matter described in this disclosure can be implemented in an apparatus for wireless communication. The apparatus may include means for receiving a carrier indication that identifies a first carrier and a second carrier for communication between a UE and a network entity, means for receiving, using the first carrier, a first QCL indication that identifies a first set of QCL information that corresponds to a reference signal received using the first carrier, and means for receiving, using the second carrier, a second QCL indication that identifies the reference signal and that indicates that the first set of QCL information is associated with signaling received using the second carrier.

Another innovative aspect of the subject matter described in this disclosure can be implemented in a non-transitory computer-readable medium storing code for wireless communication. The code may include instructions executable by a processor to receive a carrier indication that identifies a first carrier and a second carrier for communication between a UE and a network entity, receive, using the first carrier, a first QCL indication that identifies a first set of QCL information that corresponds to a reference signal received using the first carrier, and receive, using the second carrier, a second QCL indication that identifies the reference signal and that indicates that the first set of QCL information is associated with signaling received using the second carrier.

Another innovative aspect of the subject matter described in this disclosure can be implemented in a method for wireless communication. The method may include outputting a carrier indication that identifies a first carrier and a second carrier for communication between a UE and a network entity, outputting, using the first carrier, a first QCL indication that identifies a first set of QCL information that corresponds to a reference signal output using the first carrier, and outputting, using the second carrier, a second QCL indication that identifies the reference signal and that indicates that the first set of QCL information is associated with signaling output using the second carrier.

Another innovative aspect of the subject matter described in this disclosure can be implemented in an apparatus for wireless communication. The apparatus may include a processor, memory coupled with the processor, and instructions stored in the memory. The instructions may be executable by the processor to cause the apparatus to output a carrier indication that identifies a first carrier and a second carrier for communication between a UE and a network entity, output, using the first carrier, a first QCL indication that identifies a first set of QCL information that corresponds to a reference signal output using the first carrier, and output, using the second carrier, a second QCL indication that identifies the reference signal and that indicates that the first set of QCL information is associated with signaling output using the second carrier.

Another innovative aspect of the subject matter described in this disclosure can be implemented in an apparatus for wireless communication. The apparatus may include means for outputting a carrier indication that identifies a first carrier and a second carrier for communication between a UE and a network entity, means for outputting, using the first carrier, a first QCL indication that identifies a first set of QCL information that corresponds to a reference signal output using the first carrier, and means for outputting, using the second carrier, a second QCL indication that identifies the reference signal and that indicates that the first set of QCL information is associated with signaling output using the second carrier.

Another innovative aspect of the subject matter described in this disclosure can be implemented in a non-transitory computer-readable medium storing code for wireless communication. The code may include instructions executable by a processor to output a carrier indication that identifies a first carrier and a second carrier for communication between a UE and a network entity, output, using the first carrier, a first QCL indication that identifies a first set of QCL information that corresponds to a reference signal output using the first carrier, and output, using the second carrier, a second QCL indication that identifies the reference signal and that indicates that the first set of QCL information is associated with signaling output using the second carrier.

DETAILED DESCRIPTION

Figure 1:
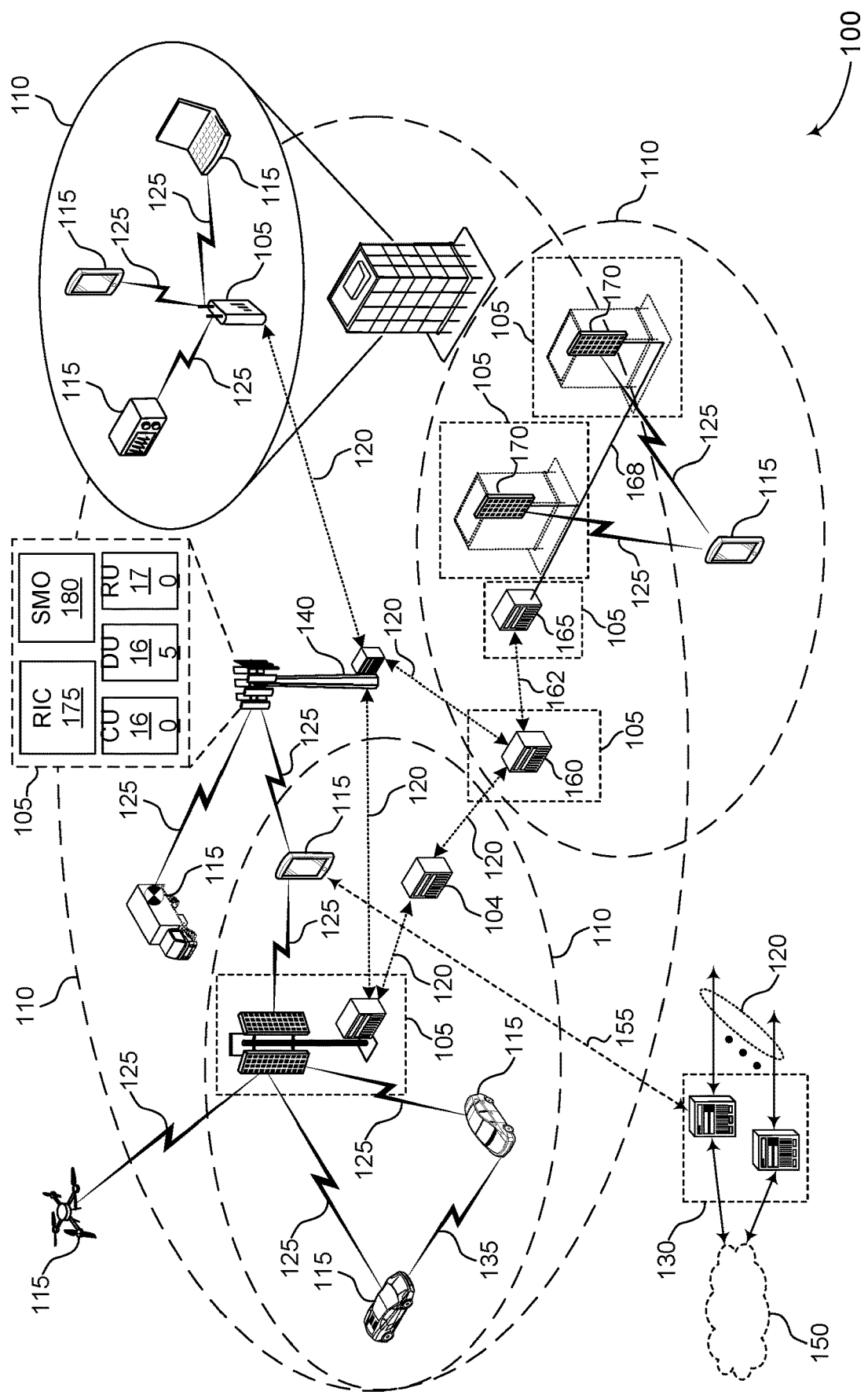
FIGS. 1 and 2 each illustrate an example of a wireless communication system that supports quasi co-location (QCL) relationship indications for dormant and/or deactivated carriers in accordance with one or more aspects of the present disclosure.

In some wireless communication systems, operations performed at a network entity may lead to increased energy consumption and increased cost associated with the increased energy consumption. In some cases, to conserve energy at the network entity, the network entity may support secondary cell (SCell) deactivation in which the network entity may deactivate use of an SCell for wireless communication. For instance, the network entity may transmit control signaling to a user equipment (UE) that indicates, to the UE, to deactivate use of an SCell. In some cases, the network entity may refrain from using a carrier associated with the deactivated SCell for downlink transmissions to the UE (for example, to conserve energy). A carrier associated with a deactivated SCell may be referred to as a deactivated carrier. Additionally, or alternatively, the network entity may support SCell dormancy in which the network entity may activate a dormant mode (for example, use of a dormant bandwidth part (BWP)) for a carrier associated with an SCell. A carrier in which the dormant mode is activated may be referred to as a dormant carrier. Because the network entity may refrain from using a deactivated or dormant carrier to transmit reference signals (or other types of signaling), the network entity may use another carrier associated with another cell to determine a quality of the SCell associated with the deactivated or dormant carrier. For instance, the network entity may configure the UE with an anchor carrier associated with an anchor cell, and may use the anchor carrier to transmit a reference signal to the UE. In some instances, the network entity may infer (for example, determine) the quality of the SCell based on measurements performed at the UE on the reference signal. Additionally, or alternatively, the UE may identify one or more parameters for reception of signaling transmitted using the SCell based on a quasi co-location (QCL) relationship between, for example, the signaling and the reference signal. However, the network entity may be incapable of indicating, or not configured to indicate, such a QCL relationship to the UE. For instance, the network entity may lack a mechanism for indicating QCL relationships between signaling transmitted using carriers associated with different cells.

Various aspects generally relate to QCL relationship indications for dormant and/or deactivated carriers, and more specifically, to a framework for configuring a UE with a QCL relationship between a reference signal transmitted using an anchor cell and signaling transmitted using an SCell. For example, a network entity may configure the UE to use an anchor carrier associated with the anchor cell and an SCell carrier associated with the SCell. In such an example, the network entity and the UE may use the anchor carrier to transmit a first QCL indication to the UE. The first QCL indication may identify, to the UE, a first set of QCL information that corresponds to a reference signal received, or to be received, at the UE using the anchor carrier. In some examples, subsequent to transmitting the first QCL indication, over a duration in which the SCell may be active/activated or in a non-dormant mode, the network entity may use the SCell carrier to transmit a second QCL indication to the UE. The second QCL indication may identify the reference signal received, or to be received, at the UE using the anchor carrier. Additionally, or alternatively, the second QCL indication may indicate, to the UE, that the first set of QCL information is associated with signaling to be received at the UE using the SCell carrier. That is, the network entity may use the second QCL indication to configure the UE with the QCL relationship between the reference signal transmitted using the anchor cell and the signaling transmitted using the SCell. In some examples, subsequent to transmitting the second QCL indication, the network entity may indicate, to the UE, to deactivate the SCell or to switch the SCell from the non-dormant mode to the dormant mode, such that the network entity may refrain from using the SCell for downlink transmissions to the UE. In some examples, subsequent to transmitting the reference signal using the anchor carrier, the network entity may indicate, to the UE, to activate the SCell or to switch the SCell from the dormant mode to the non-dormant mode, such that the network entity may use the SCell to transmit the signaling to the UE. In such examples, based on the QCL relationship, the UE may receive the signaling from the network entity in accordance with the first set of QCL information and the reference signal.

Particular aspects of the subject matter described in this disclosure may be implemented to realize one or more of the following potential advantages. The techniques employed by the described communication devices may provide energy savings for a network entity by enabling the network entity to reduce signaling overhead associated with determining a quality of a dormant or deactivated SCell. For example, the network entity may determine the quality of a previously dormant or deactivated SCell with reduced signaling overhead by using an anchor carrier associated with the SCell to transmit a reference signal to a UE and by configuring the UE with a QCL relationship between the reference signal and signaling transmitted using the SCell, instead of relying on the SCell to transmit such a reference signal, which would require the SCell to be active. In some implementations, operations performed by the described communication devices, may support improvements to a latency and a reliability for downlink communications via the previously dormant or deactivated SCell, among other possible benefits, by enabling the network entity to use the previously dormant or deactivated SCell to transmit signaling without first using the previously dormant or deactivated SCell to transmit a reference signal for determining the quality.

Aspects of the disclosure are initially described in the context of wireless communication systems. Aspects of the disclosure are also described in the context of a timing diagram and a process flow. Aspects of the disclosure are further illustrated by and described with reference to apparatus diagrams, system diagrams, and flowcharts that relate to QCL relationship indications for dormant and/or deactivated carriers.

FIG. 1 illustrates an example of a wireless communication system 100 that supports QCL relationship indications for dormant and/or deactivated carriers in accordance with one or more aspects of the present disclosure. The wireless communication system 100 may include one or more network entities 105, one or more UEs 115, and a core network 130. In some examples, the wireless communication system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communication system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (for example, a radio frequency (RF) access link). For example, a network entity 105 may support a coverage area 110 (for example, a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communication system 100, and each UE 115 may be stationary, or mobile, or both at different times. The UEs 115 may be devices in different forms or having different capabilities. Some example UEs 115 are illustrated in FIG. 1. The UEs 115 may be capable of supporting communication with various types of devices, such as other UEs 115 or network entities 105, as shown in FIG. 1.

A node of the wireless communication system 100, which may be referred to as a network node, or a wireless node, may be a network entity 105 (for example, any network entity), a UE 115 (for example, any UE), a network controller, an apparatus, a device, a computing system, one or more components, or another suitable processing entity configured to perform any of the techniques described in this disclosure. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, among other examples, may include disclosure of the UE 115, network entity 105, apparatus, device, computing system, among other examples, being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (for example, in accordance with an S1, N2, N3, or other interface protocol). In some examples, network entities 105 may communicate with one another via a backhaul communication link 120 (for example, in accordance with an X2, Xn, or other interface protocol) either directly (for example, directly between network entities 105) or indirectly (for example, via a core network 130). In some examples, network entities 105 may communicate with one another via a midhaul communication link 162 (for example, in accordance with a midhaul interface protocol) or a fronthaul communication link 168 (for example, in accordance with a fronthaul interface protocol), or any combination thereof. The backhaul communication links 120, midhaul communication links 162, or fronthaul communication links 168 may be or include one or more wired links (for example, an electrical link, an optical fiber link), one or more wireless links (for example, a radio link, a wireless optical link), among other examples or various combinations thereof. A UE 115 may communicate with the core network 130 via a communication link 155.

One or more of the network entities 105 may include or may be referred to as a base station 140 (for example, a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (for example, a base station 140) may be implemented in an aggregated (for example, monolithic, standalone) base station architecture, which may be configured to utilize a protocol stack that is physically or logically integrated within a single network entity 105 (for example, a single RAN node, such as a base station 140).

In some examples, a network entity 105 may be implemented in a disaggregated architecture (for example, a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (for example, a network configuration sponsored by the O-RAN Alliance), or a virtualized RAN (vRAN) (for example, a cloud RAN (C-RAN)). For example, a network entity 105 may include one or more of a central unit (CU) 160, a distributed unit (DU) 165, a radio unit (RU) 170, a RAN Intelligent Controller (RIC) 175 (for example, a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (for example, separate physical locations). In some examples, one or more network entities 105 of a disaggregated RAN architecture may be implemented as virtual units (for example, a virtual CU (VCU), a virtual DU (VDU), a virtual RU (VRU)).

The split of functionality between a CU 160, a DU 165, and an RU 170 is flexible and may support different functionalities depending on which functions (for example, network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (for example, layer 3 (L3), layer 2 (L2)) functionality and signaling (for example, Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (for example, physical (PHY) layer) or L2 (for example, radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (for example, via one or more RUs 170). In some cases, a functional split between a CU 160 and a DU 165, or between a DU 165 and an RU 170 may be within a protocol layer (for example, some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (for example, F1, F1-c, F1-u), and a DU 165 may be connected to one or more RUs 170 via a fronthaul communication link 168 (for example, open fronthaul (FH) interface). In some examples, a midhaul communication link 162 or a fronthaul communication link 168 may be implemented in accordance with an interface (for example, a channel) between layers of a protocol stack supported by respective network entities 105 that are in communication via such communication links.

In wireless communication systems (for example, wireless communication system 100), infrastructure and spectral resources for radio access may support wireless backhaul link capabilities to supplement wired backhaul connections, providing an IAB network architecture (for example, to a core network 130). In some cases, in an IAB network, one or more network entities 105 (for example, IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (for example, a donor base station 140). The one or more donor network entities 105 (for example, IAB donors) may be in communication with one or more additional network entities 105 (for example, IAB nodes 104) via supported access and backhaul links (for example, backhaul communication links 120). IAB nodes 104 may include an IAB mobile termination (IAB-MT) controlled (for example, scheduled) by DUs 165 of a coupled IAB donor. An IAB-MT may include an independent set of antennas for relay of communication with UEs 115, or may share the same antennas (for example, of an RU 170) of an IAB node 104 used for access via the DU 165 of the IAB node 104 (for example, referred to as virtual IAB-MT (vIAB-MT)). In some examples, the IAB nodes 104 may include DUs 165 that support communication links with additional entities (for example, IAB nodes 104, UEs 115) within the relay chain or configuration of the access network (for example, downstream). In such cases, one or more components of the disaggregated RAN architecture (for example, one or more IAB nodes 104 or components of IAB nodes 104) may be configured to operate according to the techniques described in this disclosure.

In the case of the techniques described in this disclosure applied in the context of a disaggregated RAN architecture, one or more components of the disaggregated RAN architecture may be configured to support QCL relationship indications for dormant and/or deactivated carriers. For example, some operations described as being performed by a UE 115 or a network entity 105 (for example, a base station 140) may additionally, or alternatively, be performed by one or more components of the disaggregated RAN architecture (for example, IAB nodes 104, DUs 165, CUs 160, RUs 170, RIC 175, SMO 180).

A UE 115 may include or may be referred to as a mobile device, a wireless communication device, a remote device, a handheld device, or a subscriber device, or some other suitable terminology. In some examples, the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (for example, an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (for example, a BWP) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (for example, entity, sub-entity) of a network entity 105. For example, the terms "transmitting," "receiving," or "communicating," in examples that may be referring to a network entity 105, may refer to any portion of a network entity 105 (for example, a base station 140, a CU 160, a DU 165, a RU 170) of a RAN communicating with another device (for example, directly or via one or more other network entities 105).

In some examples, such as in a carrier aggregation configuration, a carrier may also have acquisition signaling or control signaling that coordinates operations for other carriers. A carrier may be associated with a frequency channel (for example, an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (for example, of the same or a different radio access technology).

The communication links 125 shown in the wireless communication system 100 may include downlink transmissions (for example, forward link transmissions) from a network entity 105 to a UE 115, uplink transmissions (for example, return link transmissions) from a UE 115 to a network entity 105, or both, among other configurations of transmissions. Carriers may carry downlink or uplink communication (for example, in an FDD mode) or may be configured to carry downlink and uplink communication (for example, in a TDD mode).

A carrier may be associated with a particular bandwidth of the RF spectrum and, in some examples, the carrier bandwidth may be referred to as a "system bandwidth" of the carrier or the wireless communication system 100. For example, the carrier bandwidth may be one of a set of bandwidths for carriers of a particular radio access technology (for example, 1.4, 3, 5, 10, 15, 20, 40, or 80 megahertz (MHz)). Devices of the wireless communication system 100 (for example, the network entities 105, the UEs 115, or both) may have hardware configurations that support communication using a particular carrier bandwidth or may be configurable to support communication using one of a set of carrier bandwidths. In some examples, the wireless communication system 100 may include network entities 105 or UEs 115 that support concurrent communication using carriers associated with multiple carrier bandwidths. In some examples, each served UE 115 may be configured for operating using portions (for example, a sub-band, a BWP) or all of a carrier bandwidth.

Signal waveforms transmitted via a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol duration (for example, a duration of one modulation symbol) and one subcarrier, in which case the symbol duration and subcarrier spacing may be inversely related. The quantity of bits carried by each resource element may depend on the modulation scheme (for example, the order of the modulation scheme, the coding rate of the modulation scheme, or both), such that a relatively higher quantity of resource elements (for example, in a transmission duration) and a relatively higher order of a modulation scheme may correspond to a relatively higher rate of communication. A wireless communication resource may refer to a combination of an RF spectrum resource, a time resource, and a spatial resource (for example, a spatial layer, a beam), and the use of multiple spatial resources may increase the data rate or data integrity for communication with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communication for the UE 115 may be restricted to one or more active BWPs.

The time intervals for the network entities 105 or the UEs 115 may be expressed in multiples of a basic time unit which may, for example, refer to a sampling duration of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communication resource may be organized according to radio frames each having a specified duration (for example, 10 milliseconds (ms)). Each radio frame may be identified by a system frame number (SFN) (for example, ranging from 0 to 1023).

Each frame may include multiple consecutively-numbered subframes or slots, and each subframe or slot may have the same duration. In some examples, a frame may be divided (for example, in the time domain) into subframes, and each subframe may be further divided into a quantity of slots. Alternatively, each frame may include a variable quantity of slots, and the quantity of slots may depend on subcarrier spacing. Each slot may include a quantity of symbol durations (for example, depending on the length of the cyclic prefix prepended to each symbol duration). In some wireless communication systems 100, a slot may further be divided into multiple mini-slots associated with one or more symbols. Excluding the cyclic prefix, each symbol duration may be associated with one or more (for example, $N_f$) sampling durations. The duration of a symbol duration may depend on the subcarrier spacing or frequency band of operation.

A subframe, a slot, a mini-slot, or a symbol may be the smallest scheduling unit (for example, in the time domain) of the wireless communication system 100 and may be referred to as a transmission time interval (TTI). In some examples, the TTI duration (for example, a quantity of symbol durations in a TTI) may be variable. Additionally, or alternatively, the smallest scheduling unit of the wireless communication system 100 may be dynamically selected (for example, in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a set of symbol durations and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (for example, using a carrier) and may be associated with an identifier for distinguishing neighboring cells (for example, a physical cell identifier (PCID), a virtual cell identifier (VCID), or others). In some examples, a cell also may refer to a coverage area 110 or a portion of a coverage area 110 (for example, a sector) over which the logical communication entity operates. Such cells may range from smaller areas (for example, a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (for example, several kilometers in radius) and may allow unrestricted access by the UEs 115 with service subscriptions with the network provider supporting the macro cell. A small cell may be associated with a lower-powered network entity 105 (for example, a lower-powered base station 140), as compared with a macro cell, and a small cell may operate using the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A network entity 105 may support one or multiple cells and may also support communication via the one or more cells using one or multiple component carriers.

In some examples, a network entity 105 (for example, a base station 140, an RU 170) may be movable and provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communication system 100 may include, for example, a heterogeneous network in which different types of the network entities 105 provide coverage for various coverage areas 110 using the same or different radio access technologies.

The wireless communication system 100 may be configured to support ultra-reliable communication or low-latency communication, or various combinations thereof. For example, the wireless communication system 100 may be configured to support ultra-reliable low-latency communications (URLLC). The UEs 115 may be designed to support ultra-reliable, low-latency, or critical functions. Ultra-reliable communication may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (for example, in accordance with a peer-to-peer (P2P), D2D, or sidelink protocol). In some examples, one or more UEs 115 of a group that are performing D2D communication may be within the coverage area 110 of a network entity 105 (for example, a base station 140, an RU 170), which may support aspects of such D2D communication being configured by (for example, scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communication may support a one-to-many (1:M) system in which each UE 115 transmits to each of the other UEs 115 in the group. In some examples, a network entity 105 may facilitate the scheduling of resources for D2D communication. In some other examples, D2D communication may be carried out between the UEs 115 without an involvement of a network entity 105.

The core network 130 may provide user authentication, access authorization, tracking. Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (for example, base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communication system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (for example, less than 100 kilometers) compared to communication using the smaller frequencies and longer waves of the high frequency (HF) or very high frequency (VHF) portion of the spectrum below 300 MHz.

The wireless communication system 100 may utilize both licensed and unlicensed RF spectrum bands. For example, the wireless communication system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (for example, LAA). Operations using unlicensed spectrum may include downlink transmissions, uplink transmissions, P2P transmissions, or D2D transmissions, among other examples.

A network entity 105 (for example, a base station 140, an RU 170) or a UE 115 may be equipped with multiple antennas, which may be used to employ techniques such as transmit diversity, receive diversity, multiple-input multiple-output (MIMO) communication, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communication with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (for example, a network entity 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A network entity 105 or a UE 115 may use beam sweeping techniques as part of beamforming operations. For example, a network entity 105 (for example, a base station 140, an RU 170) may use multiple antennas or antenna arrays (for example, antenna panels) to conduct beamforming operations for directional communication with a UE 115. Some signals (for example, synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (for example, by a transmitting device, such as a network entity 105, or by a receiving device, such as a UE 115) a beam direction for later transmission or reception by the network entity 105.

Some signals, such as data signals associated with a particular receiving device, may be transmitted by transmitting device (for example, a transmitting network entity 105, a transmitting UE 115) along a single beam direction (for example, a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (for example, by a network entity 105 or a UE 115) may be performed using multiple beam directions, and the device may use a combination of digital precoding or beamforming to generate a combined beam for transmission (for example, from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted along one or more directions by a network entity 105 (for example, a base station 140, an RU 170), a UE 115 may employ similar techniques for transmitting signals multiple times along different directions (for example, for identifying a beam direction for subsequent transmission or reception by the UE 115) or for transmitting a signal along a single direction (for example, for transmitting data to a receiving device).

A receiving device (for example, a UE 115) may perform reception operations in accordance with multiple receive configurations (for example, directional listening) for examples in which the receiving device may be receiving various signals from a receiving device (for example, a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, to receive a data signal). The single receive configuration may be aligned along a beam direction determined based on listening according to different receive configuration directions (for example, a beam direction determined to have a highest signal strength, highest signal-to-noise ratio (SNR), or otherwise acceptable signal quality based on listening according to multiple beam directions).

In some cases, the wireless communication system 100 may support one or more operations performed at a network entity 105 that may lead to increased energy consumption. To conserve energy, the network entity 105 may support SCell deactivation and SCell dormancy. In some cases, the network entity 105 may configure a UE 115 with an anchor cell to determine a quality of an SCell associated with a deactivated or dormant carrier. For instance, the network entity 105 may infer the quality of the SCell based on measurements performed at the UE 115 on a reference signal transmitted using an anchor carrier associated with the anchor cell. Additionally, or alternatively, the UE 115 may identify receive parameters to be used for reception of signaling transmitted using the previously deactivated or dormant carrier based on a QCL relationship between the signaling and the reference signal. In some cases, however, the network entity 105 may be incapable of indicating such a QCL relationship to the UE 115. For instance, the network entity 105 may lack a mechanism for indicating QCL relationships between signaling transmitted using carriers associated with different cells, such as the anchor carrier associated with the anchor cell and the previously deactivated or dormant carrier associated with the SCell.

In some examples, the wireless communication system 100 may support a framework for configuring the UE 115 with a QCL relationship between a reference signal transmitted using an anchor cell and signaling transmitted using an SCell. For example, the UE 115 may receive a carrier indication that identifies a first carrier (for example, an anchor carrier associated with the anchor cell) and a second carrier (for example, an SCell carrier associated with the SCell) for communication between the UE 115 and the network entity 105. The UE 115 may receive a first QCL indication using the first carrier. The first QCL indication may identify a first set of QCL information that corresponds to a reference signal received at the UE 115 using the first carrier. The UE 115 may receive a second QCL indication using the second carrier. The second QCL indication may identify the reference signal and may indicate that the first set of QCL information may be associated with signaling received using the second carrier. That is, the network entity 105 may use the second QCL indication to configure the UE 115 with a QCL relationship between the reference signal transmitted using the first carrier and the signaling transmitted using the second carrier. In some examples, the network entity 105 may reduce power consumption and improve communication efficiency within the wireless communication system 100, among other benefits, by configuring the UE 115 with the QCL relationship between the reference signal transmitted using the first carrier and the signaling transmitted using the second carrier.

Figure 2:
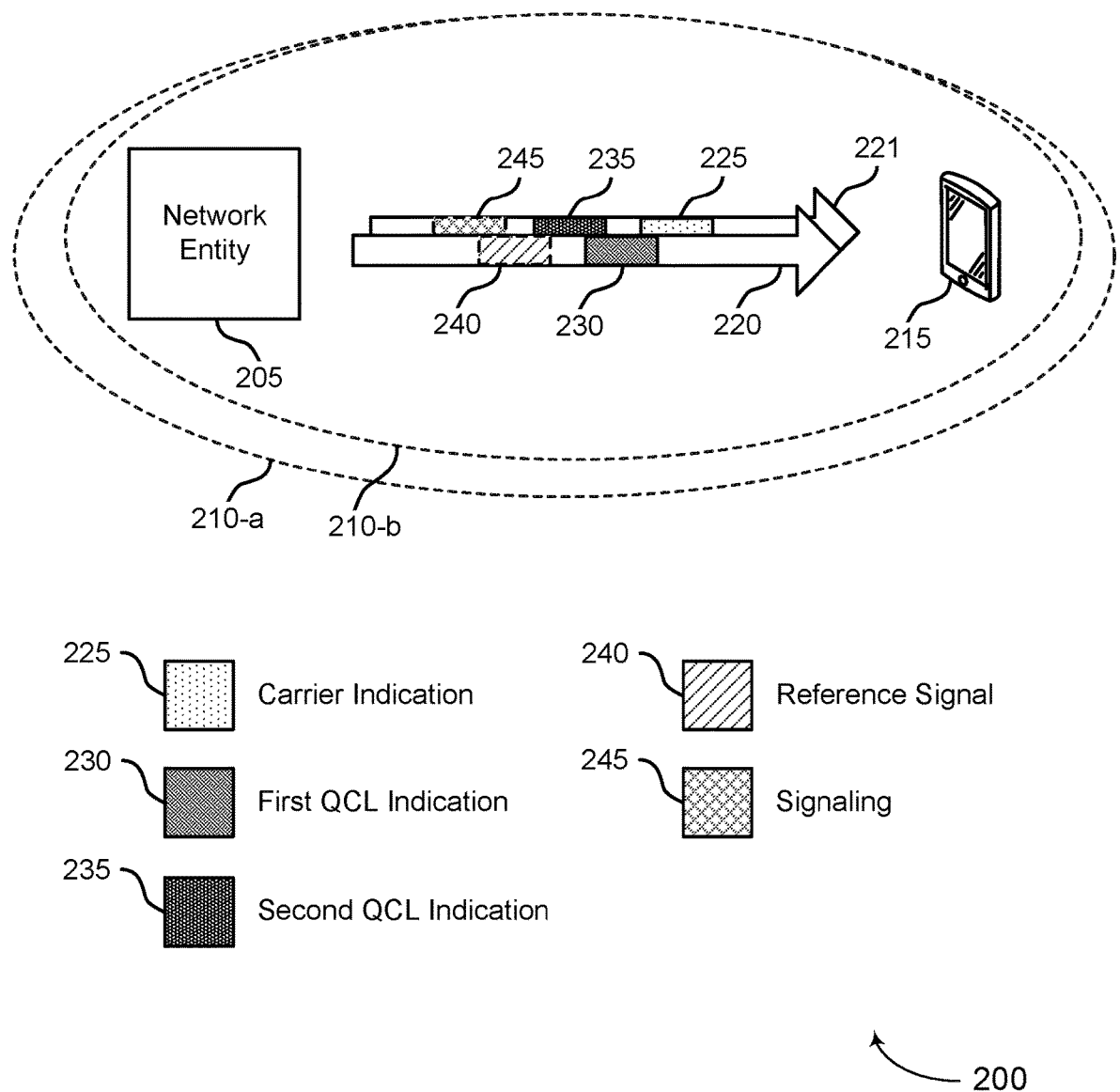

FIG. 2 illustrates an example of a wireless communication system 200 that supports QCL relationship indications for dormant and/or deactivated carriers in accordance with one or more aspects of the present disclosure. The wireless communication system 200 may implement or be implemented at one or more aspects of the wireless communication system 100. For example, the wireless communication system 200 may include a UE 215 and a network entity 205, which may be examples of the corresponding devices illustrated by and described with reference to FIG. 1. The UE 215 and network entity 205 may communicate within a coverage area 210-a or a coverage area 210-b, or both, which may be examples of a coverage area 110 illustrated by and described with reference to FIG. 1.

In some examples, the network entity 205 may configure the UE 215 to use one or more carriers for wireless communication with the network entity 205. For example, the network entity 205 may configure the UE 215 with multiple carriers to increase a data capacity of wireless communication within the wireless communication system 200. As illustrated in the example of FIG. 2, the network entity 205 may use an anchor carrier 220 and an SCell carrier 221 for wireless communication with the UE 215. The anchor carrier 220 may be associated with (for example, may serve) an anchor cell providing the coverage area 210-a. In some examples, the anchor cell may correspond to a primary cell (PCell). The SCell carrier 221 may be associated with (for example, may serve) an SCell providing the coverage area 210-b. In some examples, a carrier associated with an SCell, such as the SCell carrier 221, may be referred to as a secondary carrier.

In some examples, operations performed at the network entity 205 may lead to increased energy consumption and increased costs (for example, due to the increased energy consumption) within the wireless communication system 200. For example, a communication network, such as a cellular network, may incur relatively high cost from network energy consumption associated with operating (for example, to run) the cellular network. In some examples, a portion of network expenses (for example, about 23% of a total expense) may be due to operations of the cellular network. In such examples, a relatively large portion (for example, about 50% in 5G) of the network energy consumption may be due to RANs, such as the network entity 205. In some examples, some network energy savings features (for example, implemented at the RANs, such as the network entity 205) may provide benefits for adoption and expansion of cellular networks. That is, the wireless communication system 200 (for example, the network entity 205 and the UE 215) may support network energy savings features (for example, techniques) in multiple domains, such as a time domain, a frequency domain, a spatial domain, or a power domain, to reduce energy consumption at the network entity 205.

In some examples, the network energy savings features may include (for example, consider) energy consumption modes. For example, some network energy savings features may define a network entity energy consumption model (for example, a base station energy consumption model, a RAN energy consumption model). In some examples, the network entity energy consumption model may adapt some frameworks of power consumption modelling and evaluation methodology, such as frameworks of power consumption modelling and evaluation methodology for UEs, to network entities (for example, to the base station side, the gNB side). In some examples, such frameworks may include relative energy consumption for downlink communication and uplink communication performed at network entities (for example, considering factors such as power amplifier efficiency, a quantity of transmission RUs, and base station load, sleep states of the network entities, transition times associated with sleep states of the network entities, and one or more reference parameters or configurations (or both parameters and configurations).

Additionally, or alternatively, the network energy savings features may define an evaluation methodology and key performance indicators (KPIs). The evaluation methodology may target evaluating system-level network energy consumption and energy savings gains, as well as assessing or balancing (or both) an impact (for example, of network entity energy consumption) to network performance, user performance (for example, spectral efficiency, capacity, user perceived throughput (UPT), latency, handover performance, call drop rate, initial access performance, service-level agreement (SLA) assurance related KPIs), energy efficiency, UE power consumption, and UE complexity. Additionally, or alternatively, the evaluation methodology may provide for multiple KPIs (for example, may refrain from focusing on a single KPI), and may reuse some KPIs. In some examples, such as examples in which some KPIs may be insufficient, additional (for example, new) KPIs may be developed. A work group may determine one or more KPIs to evaluate and may also determine how to evaluate the one or more KPIs.

Additionally, or alternatively, some network energy savings features may include (for example, may study and identify) techniques for the network entity 205 and the UE 215 (for example, on the gNB side and the UE side) to improve network energy savings (for example, with respect to both network entity transmission and network entity reception). In some examples, such techniques may provide for increased efficiency of operations (for example, dynamically, semi-statically, or both) and increased granularity (for example, relatively finer granularity) associated with adaptation of transmissions or receptions (or both) in one or more of network energy saving techniques (for example, in one or more of the time domain, the frequency domain, the spatial domain, or the power domain) with potential support or feedback from the UE 215 (for example, including potential UE assistance information). In some examples, such techniques may include information exchange or coordination (or both) over one or more network interfaces and may include one or more other techniques (in other words, other techniques to improve network energy savings may not be precluded).

In some examples, the network energy savings features may include use of one or more dormant BWPs. For example, the network entity 205 may support a network energy savings feature in which the network entity 205 may configure the UE 215 with one or more dormant BWPs. In such an example, the network entity 205 and the UE 215 may use the dormant BWPs in accordance with a downlink dormancy behavior or an uplink dormancy behavior, or both. In some examples, the network entity 205 may configure the UE 215 with one or more dormant BWPs for each carrier (or for each cell) used for communication between the UE 215 and the network entity 205. For example, the network entity 205 may configure the UE 215 with a dormant BWP associated with the SCell carrier 221. In some examples, the network entity 205 may configure the UE 215 to use the dormant BWP associated with the SCell carrier 221 by activating the dormant BWP at the UE 215. That is, the network entity 205 may configure the dormant BWP as an active BWP (for example, an active downlink BWP) for the SCell associated with the SCell carrier 221. In some examples in which the dormant BWP for the SCell is the active BWP, the SCell may be referred to as a dormant SCell and the associated carrier may be referred to as a dormant carrier. The network entity 205 and the UE 215 may use a dormant carrier in accordance with a dormant mode, such as the downlink dormancy behavior or the uplink dormancy behavior. For example, the network entity 205 and the UE 215 may operate in accordance with the downlink dormancy behavior or the uplink dormancy behavior (or both) in response to the active BWP being switched to the dormant BWP.

In some examples, the active BWP associated with the SCell carrier 221 may be switched to the dormant BWP. In such examples, and in accordance with the downlink dormancy behavior, the UE 215 may use the SCell carrier 221 for receiving CSI-RSs from the network entity 205 and may refrain from using the SCell carrier 221 for monitoring a physical downlink control channel (PDCCH). For example, the UE 215 may refrain from (for example, stop) monitoring the PDCCH on the SCell and may continue performing CSI measurements (for example, using the CSI-RSs transmitted from the network entity 205), automatic gain control (AGC), and beam management, among other examples of operations that may be configured at the UE 215. In some examples, the UE 215 may support periodic and semi-persistent CSI reporting in accordance with the downlink dormancy behavior. Additionally, in some examples, the UE 215 may not support aperiodic CSI reporting in accordance with the downlink dormancy behavior. In some examples, the UE 215 may refrain from monitoring the PDCCH for the SCell (for example, for cross-carrier scheduling) for examples in which the scheduled SCell may be in dormancy (for example, in a dormancy mode). That is, the UE 215 may refrain from using the SCell carrier 221 to monitor the PDCCH for examples in which the active BWP associated with the SCell carrier 221 is the dormant BWP.

In some examples, the UE 215 may be configured to perform beam failure recovery (BRF) and beam failure detection (BFD) for SCells in which the dormant BWP may be the active BWP. That is, the UE 215 may be configured to perform BRF and BFD in a dormant SCell, which may also be referred to as a dormancy SCell. In some examples, the UE 215 may be capable of performing SCell BFR. In such examples, a BFR indication (for example, in the form of a scheduling request) may be sent in a serving cell (for example, in any available serving cell except the serving cell associated with the dormant BWP). In other words, BFD may be configured and performed in a dormant SCell. In some examples, a transmission configuration indicator (TCI) state for the dormant SCell may be configured in a physical downlink shared channel (PDSCH) configuration for the SCell carrier 221. That is, the network entity 205 may use a PDSCH configuration for the SCell carrier 221 (or the associated SCell) to indicate a TCI state associated with the SCell carrier 221 to the UE 215. In some examples, the UE 215 may use the TCI state to identify a beam to be used at the UE 215 for reception of signaling using the SCell carrier 221. For example, for beam management in accordance with the downlink dormancy behavior, the UE 215 may apply the configured TCI state (for example, to receive reference signals transmitted using the SCell carrier 221), and may refrain from applying other aspects of the PDSCH configuration (for example, while operating in accordance with the downlink dormancy behavior).

In some examples, timer-based transitions between non-dormancy and dormancy may not be supported. That is, the network entity 205 and the UE 215 may refrain from using timer-based transitions between a non-dormant mode and a dormant mode for the SCell carrier 221. In some examples, a timer, such as a timer indicated using a bwp-Inactivity-Timer information element (IE), may stop running while the UE 215 enters the dormant mode. That is, in examples in which a timer is running while the UE 215 may be operating in accordance with the non-dormant mode, the timer may stop in response to the UE 215 transitioning from the non-dormant mode to the dormant mode. For example, the timer may stop in response to the network entity 205 activating use of a dormant BWP.

In some examples, in accordance with the uplink dormancy behavior, the UE 215 may refrain from using the SCell carrier 221 to transmit sounding reference signals (SRSs) to the network entity 205. That is, the UE 215 may not support SRS transmission (for example, including aperiodic SRS, semi-periodic SRS, and periodic SRS) in accordance with uplink dormancy behavior, such as for cases in which the active BWP (for example, the active downlink BWP) may be switched to the dormant BWP. Additionally, or alternatively, the UE 215 may refrain from operating in accordance with some uplink behaviors (for example, may stop performing one or more uplink operations) for cases in which the active BWP may be switched to the dormant BWP. For example, the UE 215 may stop one or more uplink transmissions, suspend one or more configured uplink grants (for example, any configured uplink grant Type 1), and clear one or more other configured uplink grants (for example, any configured uplink grant Type 2) associated with the dormant SCell. That is, the UE may refrain from performing one or more uplink operations using the SCell carrier 221 associated with the SCell in examples in which the active BWP associated with the SCell is the dormant BWP. In such examples, the UE 215 may use another carrier (for example, the anchor carrier or another carrier associated with a non-dormant SCell) to report measurements performed at the UE using the CSI-RS transmitted via the dormant BWP. In some examples, the dormant BWP may correspond to a downlink BWP. For example, the network entity 205 may refrain from configuring (for example, may not define) an uplink dormant BWP at the UE 215. In such examples, the UE 215 may be configured to operate in accordance with the uplink dormancy behavior in response to the active downlink BWP being switched to the dormant BWP. In some examples, SCell dormancy may not be applicable to SCells configured for a physical uplink control channel (PUCCH), which may be referred to as PUCCH SCells. Additionally, in some instances, the UE 215 may be configured to apply a timing advance maintenance behavior for dormant SCells.

In some examples, dormancy behavior, such as the uplink dormancy behavior and the downlink dormancy behavior, may be configured at the network entity 205 and the UE 215 for UE power saving (for example, in the SCell associated with the SCell carrier 221). However, in accordance with the downlink dormancy behavior (for example, while operating in the dormant mode), the network entity 205 may use the SCell (for example, the SCell carrier 221) to transmit CSI-RS to the UE 215. Additionally, the UE 215 may perform measurements (for example, using the transmitted CSI-RS) and report the measurements to the network entity 205, such that the network entity 205 may track the SCell quality (for example, a quality of a communication channel associated with the SCell) and enable relatively fast switching from dormancy to non-dormancy. That is, because the network entity 205 may use the SCell to transmit CSI-RS while operating in the dormant mode, the network entity 205 may determine a quality of the dormant SCell and may dynamically switch from the dormant mode to the non-dormant mode.

For network energy saving, however, it may be beneficial for the network entity 205 to refrain from transmitting the CSI-RS, while tracking (for example, maintaining an understanding of) the SCell quality. That is, the network entity 205 may conserve energy by tracking the quality of the SCell without using the SCell (for example, the SCell carrier 221) to transmit CSI-RS or other types of signaling. In some examples, to track the SCell quality, the network entity 205 may associate the SCell carrier 221 (for example, the dormant or deactivated carrier) with the anchor carrier 220. For example, the network entity 205 may configure the SCell associated with the SCell carrier 221 with the anchor cell associated with the anchor carrier 220, such that measurements on reference signals transmitted using the anchor carrier 220 (for example, anchor carrier measurements) may be used at the network entity 205 to track of the quality of the SCell. For instance, some energy saving techniques may employ carriers in which SSBs (or system information blocks (SIBs)) are not transmitted. Such carriers may be referred to as SSB-less carriers or non-anchor carriers, and carriers in which SSBs (or SIBs) are transmitted may be referred to as anchor carriers. In such examples, a dormant or deactivated carrier may be an example of a non-anchor carrier.

In some examples, the network energy savings features may include one or more features for conserving energy in the frequency domain. For example, the network energy savings feature may include use of carriers in which SSBs and SIBs, such as a SIB1, may not be transmitted. That is, the network energy savings features may include use of SSB-less carriers, SIB1-less carriers, and SSB/SIB1-less carriers. Additionally, or alternatively, the network energy savings features may include use of group-common BWPs, network energy saving BWPs (NES-BWPs), and group communication (GS) switching. In some examples, the network energy savings features may include bandwidth adaptation. Additionally, or alternatively, the network energy savings features may include dynamic cell activation and deactivation. For example, the network energy saving features may include one or more cell switching and adaptation techniques, such as SCell activation and deactivation, cell wake up signaling, PCell switching, and multi-cell and sub-cell adaptation. In some examples of SCell activation and deactivation, the network entity 205 may activate or deactivate use of the SCell associated with the SCell carrier 221 at the UE 215. For example, the network entity 205 may deactivate use of the SCell at the UE 215, such that the UE 215 may refrain from using the SCell carrier 221 for communication with the network entity 205.

In some examples, such as for cell activation and deactivation (for example, relatively fast cell activation and deactivation), the network entity 205 may activate a cell such that the UE 215 may receive signaling (for example, PDSCH signaling) using the cell. In such an example, because the cell was previously deactivated (or in a dormant mode in which reference signals may not have been transmitted) the UE 215 may use a QCL assumption (for example, a QCL relationship) to determine parameters for receiving the signaling using the cell (for example, the dynamically activated cell). For example, the UE 215 may use a QCL relationship between the signaling to be received using the dynamically activated cell and signaling received using another cell. In other words, the UE 215 may be configured with two intra-band cells (or inter-band cells), such as a cell A and a cell B. In some examples, cell A may be active, while cell B may be inactive or dormant, for example from a perspective of the network entity 205. In some examples, the network entity 205 may use cell A to transmit periodic SSBs or CSI-RSs, among other examples of reference signals, to the UE 215 and may refrain from using cell B. The network entity 205 may dynamically activate cell B (for example, cell B may be turned-on, such as switched from a dormant mode to a non-dormant mode), such that cell B may be used to transmit or receive dynamic signaling. For example, the network entity 205 may use cell B to dynamically transmit a tracking reference signal (TRS), a CSI-RS, a PDCCH, or a PDSCH. In such an example, the UE 215 may use a QCL relationship between the dynamic signaling and signaling transmitted using cell A to identify QCL information and a timing reference for the dynamic signaling. That is, QCL information and timing reference for dynamic transmissions on cell B may be determined using a signal transmitted on cell A. In some examples, using the signal transmitted on cell A to determine the QCL information and timing reference for signaling on cell B may reduce energy consumption at the network entity 205. That is, because cell B may be activated dynamically (for example, not periodically), semi-static or periodic transmissions that may consume energy at the network entity 205 may occur on cell A (for example, not on cell B), which may reduce a quantity of energy used at the network entity for transmissions using cell B. That is, by using cell A for semi-static or periodic transmissions, network energy consumption for cell B may be reduced.

As illustrated in the example of FIG. 2, cell A may correspond to the anchor cell associated with the anchor carrier 220 and cell B may correspond to the SCell associated with the SCell carrier 221. That is, in some examples, the SCell carrier 221 may be dormant or deactivated. In such examples, the network entity 205 may refrain from using the SCell carrier 221 for communication with the UE 215, but may use the anchor carrier 220 to transmit reference signals to the UE 215. In some examples, the network entity 205 may dynamically activate the SCell carrier 221, such that the network entity 205 may use the SCell carrier 221 to transmit signaling to the UE 215. In some examples, to activate the SCell carrier 221, the network entity 205 may transmit an indication to the UE 215 to activate the SCell associated with the SCell carrier 221 or to switch the active BWP of the SCell from the dormant BWP to another BWP. In some instances, the network entity 205 may use the SCell carrier 221 to transmit a TRS (for example, an aperiodic TRS (A-TRS)), a CSI-RS (for example, an aperiodic CSI-RS (A-CSI-RS)), a PDCCH, or a PDSCH. In such an example, to identify QCL information and a timing reference for the signaling to be transmitted using the SCell carrier 221, the UE 215 may use a QCL relationship between the signaling to be transmitted using the SCell carrier 221 and the reference signals transmitted using the anchor carrier 220. In some instances, however, the UE 215 may be incapable of determine such a QCL relationship. For instance, the network entity 205 may lack a mechanism for indicating QCL relationships between signaling transmitted using carriers associated with different cells to the UE 215. That is, in some examples, the network entity 205 may lack a mechanism for indicating a QCL relation between a reference signal transmitted using the anchor carrier 220 associated with the anchor cell and signaling transmitted using the SCell associated with the SCell carrier 221.

In some other examples, the network entity 205 and the UE 215 may support QCL relationship indications for dormant and/or deactivated carriers in accordance with one or more aspects of the present disclosure. For example, the network entity 205 may support a framework for configuring the UE 215 with a QCL relationship between a reference signal 240 transmitted using the anchor carrier 220 and signaling 245 transmitted using the SCell carrier 221. That is, the network entity 205 may configure the UE 215 with QCL relationships for activated cells, such as cells that may have been activated relatively recently and may not have been used for reception of a reference signal (for example, to determine a quality of the cell). In some examples, the signaling 245 may include a TRS (for example, an A-TRS), a CSI-RS (for example, an A-CSI-RS), a PDCCH, or a PDSCH. As illustrated in the example of FIG. 2, the UE 215 may receive a carrier indication 225 from the network entity 205. In some examples, the carrier indication 225 may configure the UE 215 to use the anchor carrier 220 associated with the anchor cell and the SCell carrier 221 associated with the SCell. For example, the carrier indication 225 may correspond to a configuration for the SCell associated with the SCell carrier 221 and may include an indication (for example, a pointer) that the SCell may be associated with the anchor carrier 220.

In some examples, the network entity 205 may use the anchor carrier 220 to transmit a first QCL indication 230 to the UE 215. That is, the UE 215 may receive the first QCL indication 230 using the anchor carrier 220. In some examples, the first QCL indication 230 may identify, to the UE 215, a first set of QCL information that corresponds to a reference signal received (or to be received) at the UE 215 using the anchor carrier 220. For example, the first QCL indication 230 may correspond to a QCL-Info IE (for example, transmitted using or with a TCI-State IE for the anchor cell) and the first set of QCL information may correspond to one or more fields included in the QCL-Info IE, such as a bwp-Id field, a cell field, a referenceSignal field, and a qcl-Type field, among other examples of fields that may be included in an IE. In some examples, the names of IEs and fields may change based on implementation of one or multiple devices (for example, the UE 215, the network entity 205, or both).

In some examples, the network entity 205 may use the SCell carrier 221 to transmit a second QCL indication 235 to the UE 215. That is, the UE 215 may receive the second QCL indication 235 using the SCell carrier 221. In some examples, the second QCL indication 235 may identify the reference signal. Additionally, or alternatively, the second QCL indication 235 may indicate, to the UE 215, that the first set of QCL information may be associated with signaling received (or to be received) at the UE 215 using the SCell carrier 221 (for example, a previously dormant or deactivated carrier). That is, the network entity 205 may use the second QCL indication 235 to configure the UE 215 with a QCL relationship between the reference signal 240 transmitted using the anchor carrier 220 and the signaling 245 transmitted using the SCell carrier 221. In some examples, the second QCL indication 235 may correspond to the QCL-Info IE (for example, transmitted using or with a TCI-State IE for the SCell). In such an example, the network entity 205 may indicate the reference signal 240 using a field included in the QCL-info IE. For example, the QCL-info IE may include a field, such as a Specific_cell_CSI_RS field or a Specific_cell_ssb field, and content of the field may identify the reference signal 240. For instance, the content of the field may include an identifier (ID), such as an index, corresponding to the reference signal 240 (or the SCell associated with the reference signal 240). In some examples, a presence of the ID associated with the reference signal 240, may indicate that the first set of QCL information corresponding to the reference signal 240 may be associated with signaling to be transmitted using the SCell carrier 221.

In some examples, the UE 215 may receive the reference signal 240 using the first carrier and the signaling 245 using the second carrier. In such an example, the UE may receive the signaling 245 in accordance with the first set of QCL information and the reference signal 240. For example, one or more parameters used to at the UE 215 receive (and decode) the reference signal 240 may also be used at the UE 215 to receive (and decode) the signaling 245. In such an example, the one or more parameters may be based on the first set of QCL information. In some examples, by configuring the UE 215 with the QCL relationship between the reference signal 240 and the signaling 245, the network entity 205 may reduce energy consumption within the wireless communication system 200, among other possible benefits.

Figure 3:
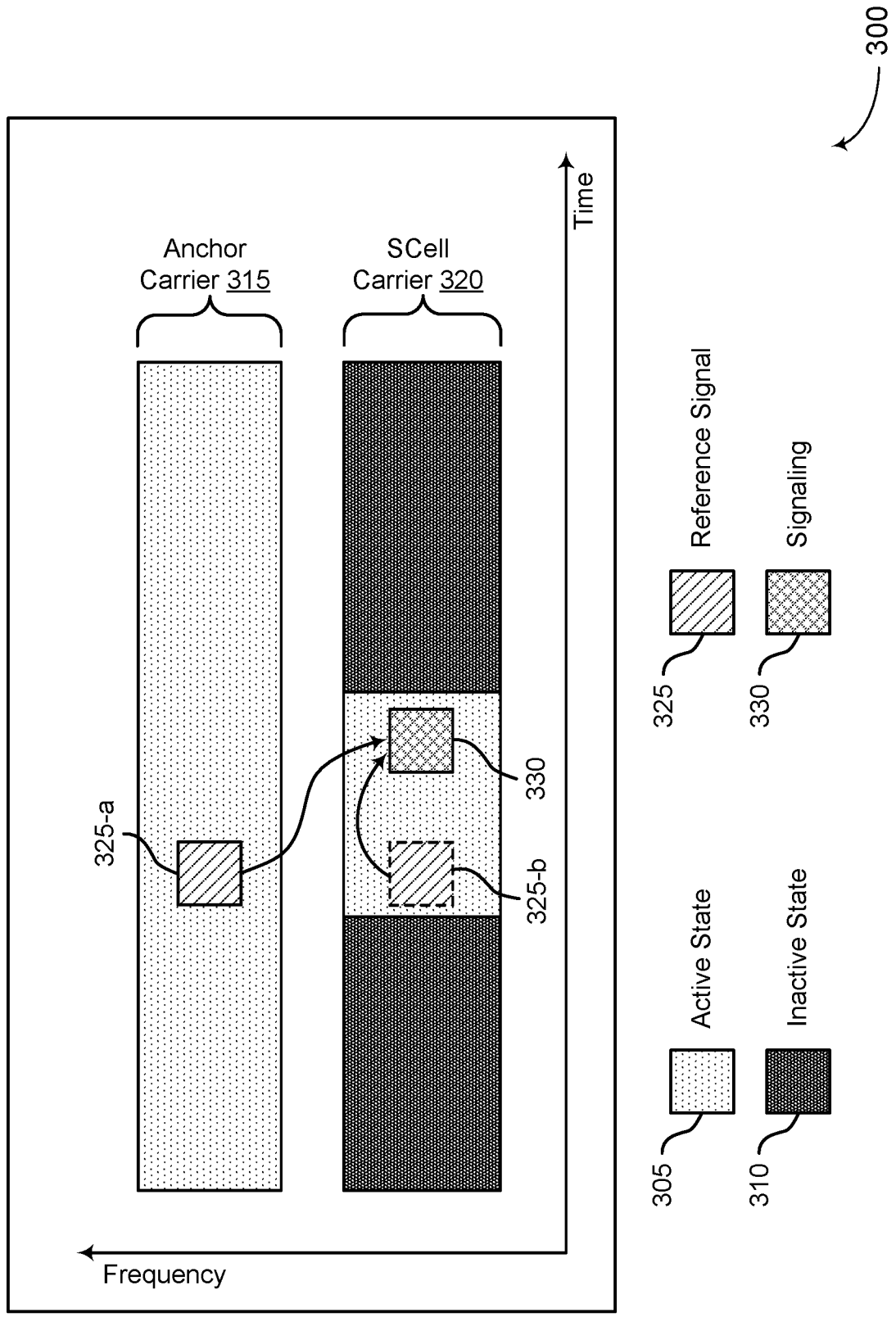
FIG. 3 illustrates an example of a timing diagram that supports QCL relationship indications for dormant and/or deactivated carriers in accordance with one or more aspects of the present disclosure.

FIG. 3 illustrates an example of a timing diagram 300 that supports QCL relationship indications for dormant and/or deactivated carriers in accordance with one or more aspects of the present disclosure. The timing diagram 300 may implement or be implemented at one or more aspects of the wireless communication system 100 and the wireless communication system 200. For example, the timing diagram 300 may be implemented at a UE or a network entity, or both, which may be examples of the corresponding devices illustrated by and described with reference to FIGS. 1 and 2.

In some examples, the network entity may support a framework for configuring the UE with a QCL relationship between a reference signal transmitted using an anchor cell and signaling transmitted using an SCell. For example, the network entity may configure the UE to use an anchor carrier 315 and an SCell carrier 320. In the example of FIG. 3, the anchor carrier 315 may be associated with the anchor cell and the SCell carrier 320 may be associated with the SCell. In some examples, the network entity may use a configuration for the SCell to indicate, to the UE, to use the anchor carrier 315 and the SCell carrier 320. For example, the configuration for the SCell may include an indication that the anchor carrier 315 may be associated with (for example, the anchor carrier for) the SCell carrier 320. In some examples, the anchor carrier 315 may be in an active state 305 over a duration, while the SCell carrier 320 may switch between the active state 305 and an inactive state 310 over the duration. That is, the network entity may dynamically indicate, to the UE, to use the SCell carrier 320 in accordance with the active state 305 or the inactive state 310.

For example, the network entity may dynamically activate or deactivate use of the SCell carrier 320 at the UE. In some examples, the network entity may activate or deactivate use of the SCell carrier 320 by activating or deactivating, respectively, the associated SCell at the UE. For example, the SCell associated with the SCell carrier 320 may be dedicated for cell activation and deactivation (for example, relatively fast cell activation and deactivation). In such an example, the network entity may transmit (for example, dynamically) downlink control information (DCI) or a MAC control element (MAC-CE) to activate or deactivate the SCell associated with the SCell carrier 320. For example, the DCI or MAC-CE may indicate, to the UE, to deactivate use of the SCell associated with the SCell carrier 320. In such an example, the UE may use the SCell carrier 320 in accordance with the inactive state 310 (for example, a deactivated state). That is, in response to the SCell associated with the SCell carrier 320 being deactivated, the UE may refrain from using the SCell carrier 320 to receive signaling from the network entity. In some examples, the DCI or the MAC-CE may indicate, to the UE, to activate use of the SCell associated with the SCell carrier 320. In such an example, the UE may use the SCell carrier 320 in accordance with the active state 305. That is, in response to the SCell associated with the SCell carrier 320 being activated, the UE may use the SCell carrier 320 to receive signaling, such as signaling 330, from the network entity.

In some other examples, the network entity may dynamically activate or deactivate use, at the UE, of a dormant BWP associated with the SCell carrier 320. For example, the network entity may transmit (for example, dynamically) DCI or a MAC CE that indicates, to the UE, to switch the active BWP associated with the SCell carrier 320 to the dormant BWP or another BWP. For example, the DCI or MAC-CE may indicate, to the UE, to use the dormant BWP associated with the SCell carrier 320. In such an example, the UE may use the SCell carrier 320 in accordance with the inactive state 310 (for example, a dormant mode). That is, in response to the dormant BWP associated with the SCell carrier 320 being activated, the UE may refrain from using the SCell carrier 320 to receive signaling from the network entity. In some examples, the DCI or the MAC-CE may indicate, to the UE, to use another BWP associated with the SCell carrier 320. In such an example, the UE may use the SCell carrier 320 in accordance with the active state 305 (for example, a non-dormant mode). That is, in response to another BWP (for example, a non-dormant BWP) associated with the SCell carrier 320 being activated, the UE may use the SCell carrier 320 to receive signaling, such as the signaling 330, from the network entity.

In some examples, the UE may use the SCell carrier 320 (for example, a cell that may be dedicated for relatively fast cell activation and deactivation) to receive an A-TRS, an A-CSI-RS, a PDCCH, and/or a PDSCH that are quasi co-located (QCLed) with signals transmitted using the anchor carrier 315. For example, the UE may receive signaling 330 using the SCell carrier 320 in accordance with a first set of QCL information that may correspond to a reference signal 325-a (for example, a reference signal received using the anchor carrier 315). That is, the UE may use a QCL assumption (for example, a QCL relationship) between the reference signal 325-a and the signaling 330 to determine receive parameters for reception of the signaling 330 (in other words, to determine one or more parameters that may be used at the UE to receive or decode the signaling 330).

In some examples, the QCL relationship and configuration (for example, the configuration for the SCell and/or a configuration for the anchor cell) may depend on the SCell (for example, the cell that may be dedicated for relatively fast cell activation and deactivation) and the associated anchor carrier (for example, the anchor carrier 315). That is, the QCL relationship and the configuration may change in response to a change to the SCell associated with the SCell carrier 320 or the anchor cell associated with the anchor carrier 315 (for example, in response to the network entity configuring another cell as the anchor cell for the SCell), or both. In other words, a QCL relationship between signaling, such as the reference signal 325-a and the signaling 330, may depend on the respective carriers used to transmit the signaling. In some examples, the anchor carrier 315 may be an example of an intra-band anchor carrier. That is, the anchor carrier 315 and the SCell carrier 320 may occur within a same RF band. In such examples, QCL type A may be assumed by the UE. That is, the QCL relationship for intra-band anchor carriers may include type A QCL parameters. For example, for QCL Type A, the UE may determine (for example, assume) that a doppler shift, a doppler spread, an average delay, and/or a delay spread associated with the reference signal 325-a may also be associated with the signaling 330. For instance, for QCL Type A, the UE may determine that the signaling 330 may be transmitted from a same location, or using same hardware, as the reference signal 325-a. In some other examples, the anchor carrier 315 may correspond to an inter-band anchor carrier. That is, the anchor carrier 315 and the SCell carrier 320 may occur within different RF bands. In such examples, QCL type C or QCL type D may be assumed. That is, the QCL relationship for inter-band anchor carriers may include type C QCL parameters or type D QCL parameters. In some examples, for QCL Type C, the UE may determine (for example, assume) that an average delay and/or a delay spread associated with the reference signal 325-a may also be associated with the signaling 330. Additionally, for QCL Type D, the UE may determine (for example, assume) that spatial receive parameters associated with the reference signal 325-a may also be associated with the signaling 330. For instance, for QCL Type D, the UE may determine that the signaling 330 is co-located with the reference signal 325-a. In some examples, a QCL type may be indicated to the UE using the first QCL indication. For example, the first QCL indication may include a field, such as a qcl-Type field, that indicates the QCL type.

In some examples, the reference signal 325-a (for example, a reference signal in the anchor carrier 315) may correspond to a reference signal configured for use in the anchor carrier 315 or the SCell carrier 320, or both. For example, the reference signal 325-a may be either an existing reference signal configured for the anchor carrier 315 or a dedicated reference signal configured in the anchor carrier 315 for use in the SCell carrier 320 (for example, the cell that may be dedicated for relatively fast cell activation and deactivation). That is, the reference signal 325-a may correspond to a reference signal that may be used at the UE (for example, and the network entity) to track a quality of the SCell carrier 320, or both the SCell carrier 320 and the anchor carrier 315. In other words, the first set of QCL information (for example, a set of one or more QCL parameters) corresponding to the reference signal 325-a may be common to the reference signal 325-a, the signaling 330, and/or other signaling that may be received using the anchor carrier 315. In some examples, the UE may be configured with a mapping relationship between one or more reference signals associated with the anchor carrier 315 (for example, the reference signal 325) and one or more signals associated with the SCell carrier 320 (for example, the signaling 330). In such an example, the UE may use the mapping relationship to identify a reference signal (for example, and corresponding QCL information) the UE may use to determine parameters for reception of the signaling 330.

In some examples, the network entity may use a first QCL indication to configure the UE with the first set of QCL information corresponding to the reference signal 325-a. For example, the network entity may transmit a QCL-Info IE to the UE for the anchor carrier 315 and the QCL-Info IE may include the first set of QCL information. In some examples, the network entity may indicate the QCL-Info IE to the UE using (or with) a TCI-State IE. In some examples, the network entity may use a second QCL indication (for example, a QCL-Info IE for the SCell carrier 320) to indicate, to the UE, that the reference signal 325-a and the corresponding QCL information (for example, the first set of QCL information) may be associated with the SCell carrier 320. For example, the second QCL indication may include a field, such as the Specific_cell_CSI_RS field or the Specific_cell_ssb field, that may identify the reference signal 325-a. For example, content of the field may include a cell ID that may correspond to the reference signal 325-a (for example, a reference signal dedicated for the anchor cell). In some examples, in response to receiving the second QCL indication that identifies the reference signal 325-a, the UE may determine that the first set of QCL information may be common to the reference signal 325-a and signaling received using the SCell carrier 320, such as the signaling 330.

In some examples, such as for a cell that may be dedicated for relatively fast cell activation and deactivation, the network entity may be capable of configure the UE with a reference signal and QCL information for the cell. For example, the network entity may be capable of configuring the UE with a reference signal 325-b, and a corresponding set of QCL information, for the SCell carrier 320. That is, the second QCL indication may include a cell ID associated with the reference signal 325-b (for example, a reference signal dedicated for the SCell) and a second set of QCL information corresponding to the reference signal 325-b. In some examples, however, the UE may be incapable of determining whether to use the reference signal 325-a or the reference signal 325-b. That is, in some examples, the UE may be incapable of determining a duration over which the UE may use the first set of QCL information provided for the anchor carrier 315 and a duration over while the UE may use the second set of QCL information provided for the SCell carrier 320 (for example, the cell that may be dedicated for relatively fast cell activation and deactivation, which may be referred to as a fast switching cell).

In some examples, multiple sets of QCL information may be provided to the UE such that one set of QCL information may be based on the anchor carrier configuration and another set of QCL information may be based on the fast switching cell configuration (for example, the SCell under relatively fast switching configuration). That is, the UE may be configured with the first set of QCL information that may be based on a configuration for the anchor carrier 315 and the second set of QCL information that may be based on a configuration for the SCell carrier 320. In some examples, such as examples in which the multiple sets of QCL information may be provided to the UE, the UE may determine to use QCL information of the anchor carrier 315 (for example, in examples in which the UE is configured with QCL information of the anchor carrier 315). That is, in some examples, the UE may determine to use the first set of QCL information in response to (for example, as long as) the first set of QCL information being configured at the UE for the anchor carrier 315.

In some other examples, such as examples in which the multiple sets of QCL information may be provided to the UE, the UE may determine a set of QCL information (for example, which set of QCL information) to use based on a rule for selecting QCL information. For example, the UE may receive RRC signaling (for example, an RRC configuration) from the network entity that includes an indication associated with the rule for selecting the QCL information. In some examples, the indication may correspond to a flag. For example, the UE may receive RRC signaling from the network entity and the RRC signaling may include a flag that indicates a set (for example, which set) of QCL information the UE may use. That is, the UE may determine to use the first set of QCL information or the second set of QCL information based on a flag included in the RRC configuration. In some examples, the rule (for example, the flag) may identify a relationship between multiple reference signals transmitted using the anchor carrier 315 and the SCell carrier 320. For example, the anchor carrier 315 may be associated with an SSB and a CSI-RS, while the SCell carrier 320 may be associated with an SSB. In such an example, the rule may indicate for the UE to use QCL information corresponding to a CSI-RS and, in response, the UE may determine to use QCL information corresponding to the CSI-RS associated with the anchor carrier 315. In some other examples, the anchor carrier 315 and the SCell carrier 320 may each be associated with an SSB and a CSI-RS. In such examples, the rule may indicate for the UE to QCL information corresponding to a reference signal associated with a default carrier.

In some examples, such as examples in which the multiple sets of QCL information are provided to the UE, the UE may determine a set (for example, which set) of QCL information to use based on an indication include in DCI or a MAC-CE. That is, the network entity may use the DCI or the MAC-CE to dynamically indicate, to the UE, to use the first set of QCL information or the second set of QCL information. In some examples, the DCI or the MAC-CE may correspond to DCI or a MAC-CE used at the network entity to switch the active BWP at the UE from the dormant BWP associated with the SCell carrier 320 to another BWP (for example, a non-dormant BWP). Additionally, or alternatively, the DCI or the MAC-CE may correspond to DCI or a MAC-CE used at the network entity to activate the SCell associated with the SCell carrier 320. For example, the network entity may transmit the DCI or the MAC-CE to the UE to trigger the UE to activate the SCell associated with the SCell carrier 320 (for example, to trigger the UE to switch from using the SCell carrier 320 in accordance with the inactive state 310 to using the SCell carrier in accordance with the active state 305). That is, the DCI or the MAC-CE may correspond to an activation DCI or an activation MAC-CE (for example, DCI or a MAC-CE that activates the SCell under fast switching). In such an example, the activation DCI or the activation MAC-CE may indicate (for example, dynamically) a set of QCL information the UE may use. For example, the activation DCI or the activation MAC-CE may include a bit (for example, an extra bit) that indicates (for example, points to) which set of QCL information may be used at the UE (for example, to determine parameters for reception of the signaling 330). That is, the activation DCI or the activation MAC-CE may include a bit that indicates the first set of QCL information or the second set of QCL information.

Additionally, or alternatively, in some examples, the activation DCI or the activation MAC-CE may include a bit that indicates the reference signal 325-a or the reference signal 325-b. In such examples, the UE may determine to use the first set of QCL information or the second set of QCL information based on whether the bit indicates the reference signal 325-a or the reference signal 325-b. For example, in examples in which the bit indicates the reference signal 325-a (or indicates the anchor carrier 315), the UE may determine to use the first set of QCL information. Alternatively, in examples in which the bit indicates the reference signal 325-b (or indicates the SCell carrier 320), the UE may determine to use the second set of QCL information. In some examples, by configuring the UE to use the first set of QCL information or the second set of QCL information, the network entity may reduce a latency associated with wireless communication between the UE and the network entity, among other possible benefits.

Figure 4:
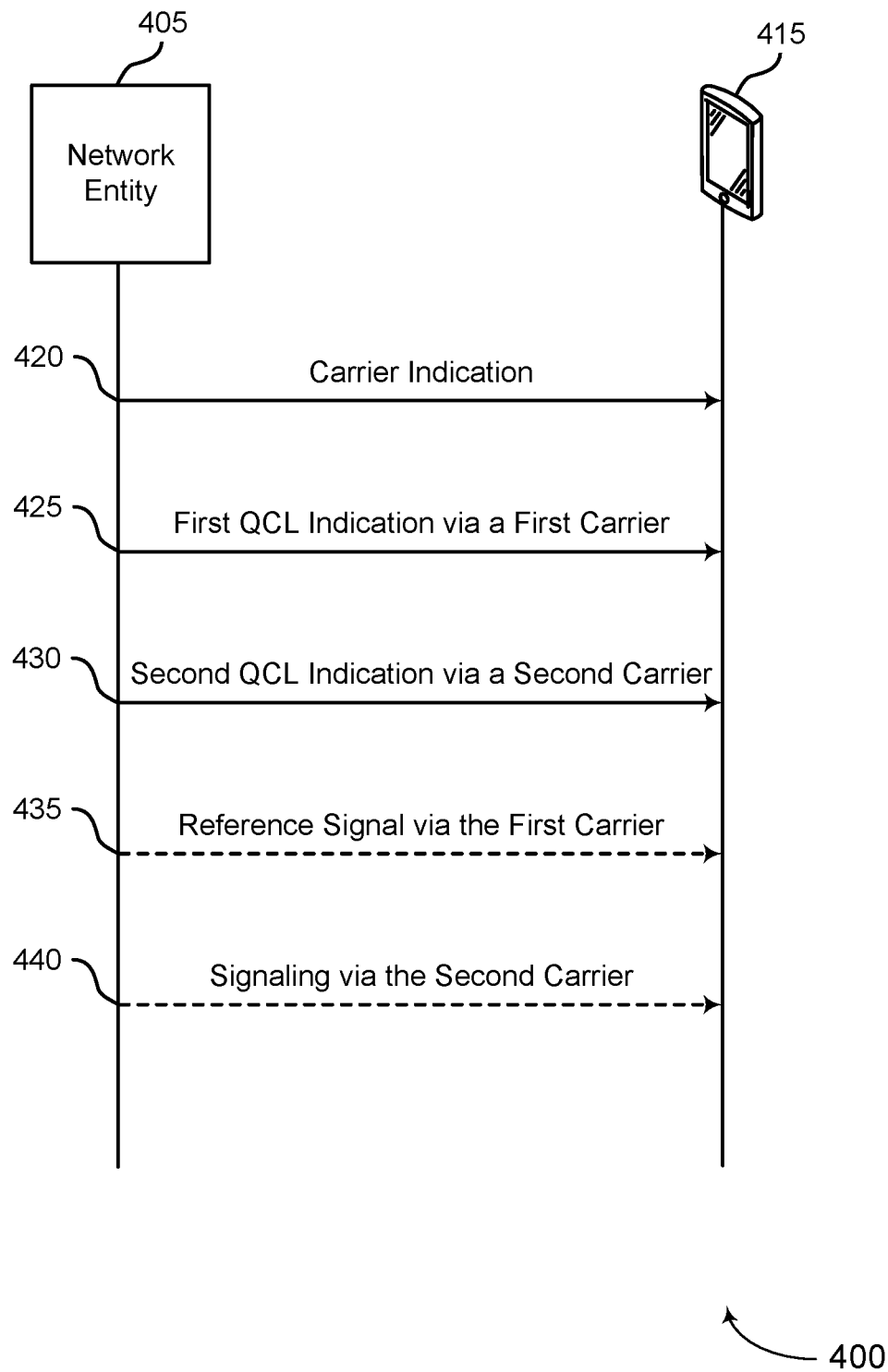
FIG. 4 illustrates an example of a process flow that supports QCL relationship indications for dormant and/or deactivated carriers in accordance with one or more aspects of the present disclosure.

FIG. 4 illustrates an example of a process flow 400 that supports QCL relationship indications for dormant and/or deactivated carriers in accordance with one or more aspects of the present disclosure. The process flow 400 may implement or be implemented to realize or facilitate aspects of the wireless communication system 100, the wireless communication system 200, and the timing diagram 300. For example, the process flow 400 may include example operations associated a network entity 405 and a UE 415, which may be examples of the corresponding devices as illustrated by and described with reference to FIGS. 1-3. The operations performed at the network entity 405 or the UE 415, or both, may support improvements to communication between the network entity 405 and the UE 415, among other benefits. In the following description of the process flow 400, the operations performed at the network entity 405 and the UE 415 may occur in a different order than the example order shown. Additionally, the operations performed at the network entity 405 and the UE 415 may occur at different times. Some operations may be combined and some operations may be omitted. In the example of FIG. 4, the network entity 405 and the UE 415 may support a framework for configuring the UE with a QCL relationship between a reference signal transmitted using an anchor cell and signaling transmitted using an SCell At 420, the UE 415 may receive a carrier indication from the network entity 405. In some examples, the carrier indication may be an example of a carrier indication as illustrated by and described with reference to FIGS. 2 and 3. For example, the carrier indication may identify a first carrier and a second carrier for communication between the UE 415 and a network entity 405. In some examples, the second carrier may correspond to an SCell carrier associated with an SCell. Additionally, in some examples, the carrier indication may be included in a configuration for the SCell. In some examples, the carrier indication may correspond to an indication that identifies the first carrier as an anchor carrier (for example, as an anchor carrier for the second carrier).

At 425, the UE 415 may receive a first QCL indication via the first carrier. In some examples, the first QCL indication may be an example of a first QCL indication as illustrated by and described with reference to FIGS. 2 and 3. For example, the first QCL indication may identify a first set of QCL information (for example, a first set of one or more parameters) that corresponds to a reference signal received using the first carrier.

At 430, the UE 415 may receive a second QCL indication via the second carrier. In some examples, the second QCL indication may be an example of a second QCL indication illustrated by and described with reference to FIGS. 2 and 3. For example, the second QCL indication may identify the reference signal and may indicate that the first set of QCL information is associated with signaling received using the second carrier. In some examples, the second QCL indication may identify the reference signal using one or more fields. For example, the second QCL indication may include a Specific_cell_CSI_RS field or a Specific_cell_ssb field that may identify the reference signal. In such an example, the UE may determine that QCL information associated with the reference signal (for example, the first set of QCL information) is common to the reference signal and signaling received (or to be received) using the second carrier. That is, the second QCL indication may indicate, to the UE 415, a QCL relationship between a reference signal that may be received at the UE 415 via the first carrier and signaling that may be received at the UE 415 via the second carrier.

For example, at 435, the UE 415 may receive the reference signal via the first carrier. In some examples, the reference signal may be an example of a reference signal as illustrated by and described with reference to FIGS. 2 and 3. For example, the reference signal may correspond to a CSI-RS.

In some examples, at 440, the UE 415 may receive the signaling via the second carrier. For example, the UE 415 may receive the signaling in accordance with the first set of QCL information and the reference signal received at 435. In some examples, based on the first set of QCL information and the reference signal, the UE 415 may identify one or more receive parameters for reception (and decoding) of the signaling via the second carrier. For example, based on the first set of QCL information, the UE may identify a receive beam for reception of the signaling using the second carrier. In some examples, by receiving the signaling via the second carrier in accordance with the first set of QCL information and the reference signal, the UE 415 may reduce a latency associated with wireless communication using the second carrier, among other possible benefits.

Figure 5:
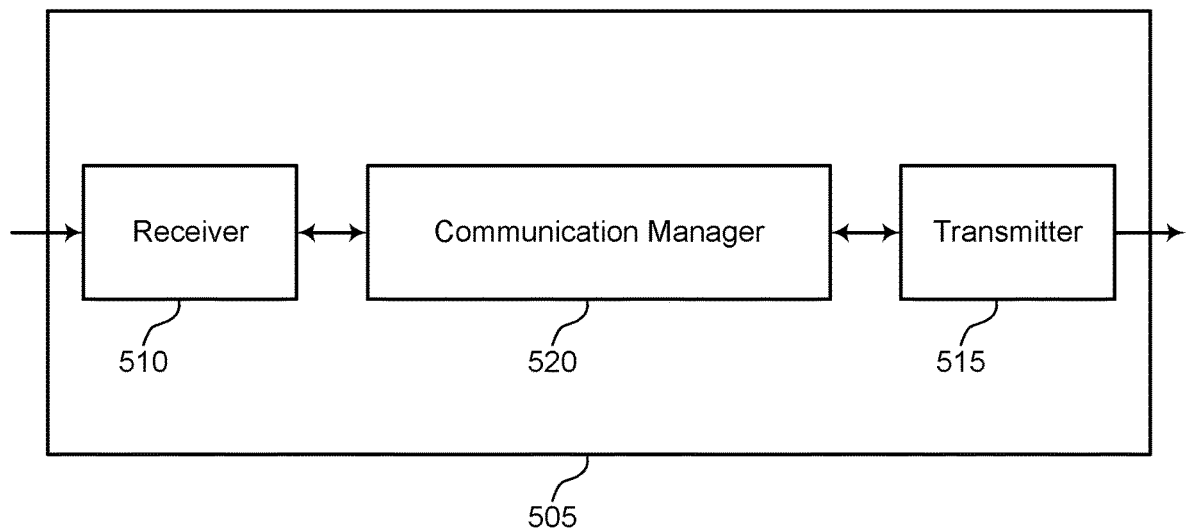
FIGS. 5 and 6 illustrate block diagrams of devices that support QCL relationship indications for dormant and/or deactivated carriers in accordance with one or more aspects of the present disclosure.

FIG. 5 illustrates a block diagram of a device 505 that supports QCL relationship indications for dormant and/or deactivated carriers in accordance with one or more aspects of the present disclosure. The device 505 may be an example of aspects of a UE. The device 505 may include a receiver 510, a transmitter 515, and a communication manager 520. The communication manager 520 can be implemented, at least in part, by one or both of a modem and a processor. Each of these components may be in communication with one another (for example, via one or more buses).

The receiver 510 may provide a means for receiving information such as packets, user data, control information, or any combination thereof associated with various information channels (for example, control channels, data channels, information channels related to QCL relationship indications for dormant and/or deactivated carriers). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (for example, control channels, data channels, information channels related to QCL relationship indications for dormant and/or deactivated carriers). In some examples, the transmitter 515 may be co-located with a receiver 510 in a transceiver. The transmitter 515 may utilize a single antenna or a set of multiple antennas.

The communication manager 520, the receiver 510, the transmitter 515, or various combinations thereof or various components thereof may be examples of means for performing various aspects of QCL relationship indications for dormant and/or deactivated carriers. For example, the communication manager 520, the receiver 510, the transmitter 515, or various combinations or components thereof may support a method for performing one or more functions.

In some examples, the communication manager 520 may be configured to perform various operations (for example, receiving, obtaining, monitoring, outputting, transmitting) using or otherwise in cooperation with the receiver 510, the transmitter 515, or both. For example, the communication manager 520 may receive information from the receiver 510, send information to the transmitter 515, or be integrated in combination with the receiver 510, the transmitter 515, or both to obtain information, output information, or perform various other operations.

The communication manager 520 may support wireless communication at a UE (for example, the device 505) in accordance with examples as disclosed herein. For example, the communication manager 520 may be configured as or otherwise support a means for receiving a carrier indication that identifies a first carrier and a second carrier for communication between the UE and a network entity. The communication manager 520 may be configured as or otherwise support a means for receiving, using the first carrier, a first QCL indication that identifies a first set of QCL information that corresponds to a reference signal received using the first carrier. The communication manager 520 may be configured as or otherwise support a means for receiving, using the second carrier, a second QCL indication that identifies the reference signal and that indicates that the first set of QCL information is associated with signaling received using the second carrier.

By including or configuring the communication manager 520 in accordance with some examples, the device 505 (for example, a processor controlling or otherwise coupled with the receiver 510, the transmitter 515, the communication manager 520, or a combination thereof) may support techniques for reduced power consumption and more efficient utilization of communication resources.

Figure 6:
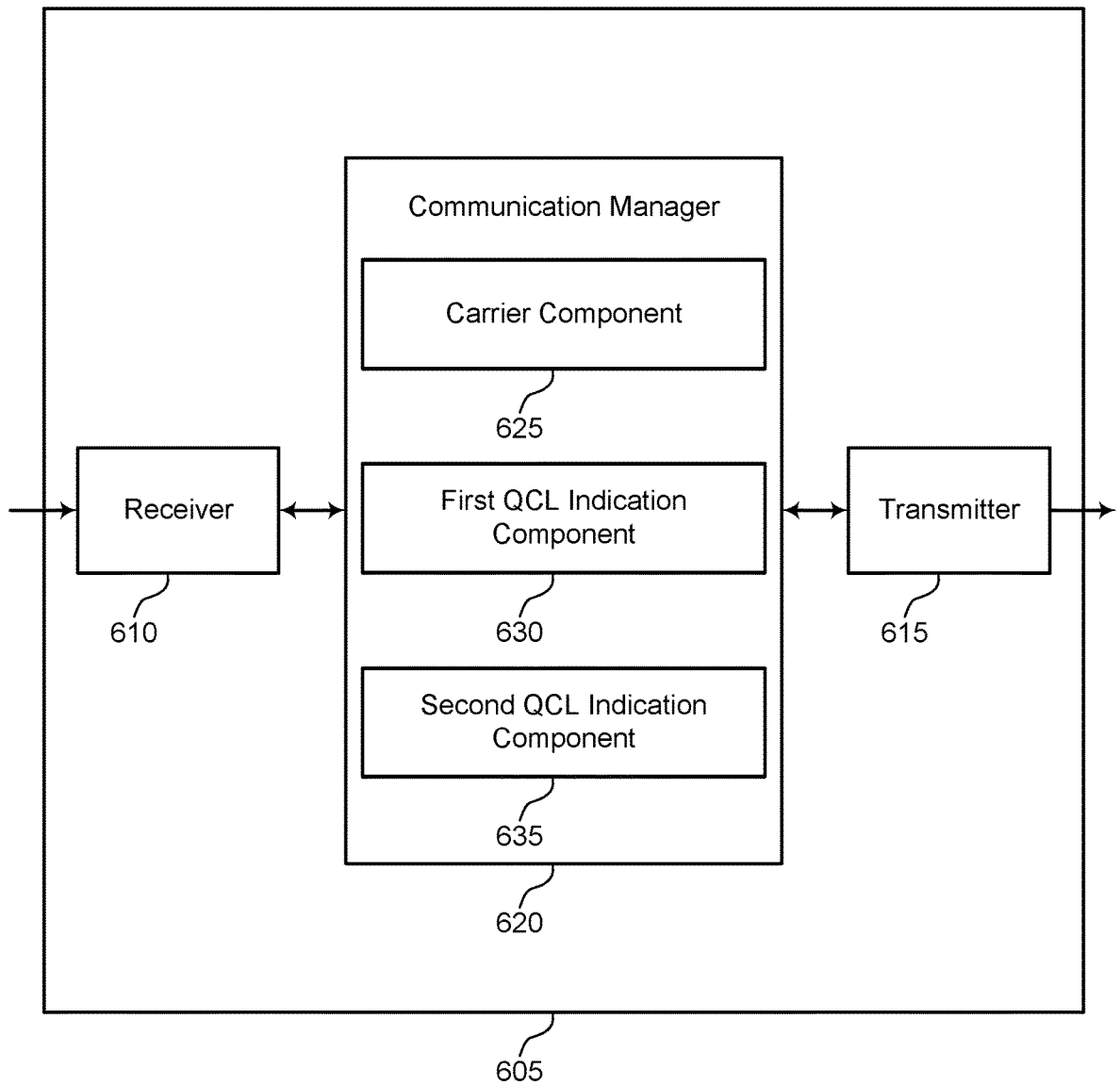

FIG. 6 illustrates a block diagram of a device 605 that supports QCL relationship indications for dormant and/or deactivated carriers in accordance with one or more aspects of the present disclosure. The device 605 may be an example of aspects of a device 505 or a UE 115. The device 605 may include a receiver 610, a transmitter 615, and a communication manager 620. The communication manager 620 can be implemented, at least in part, by one or both of a modem and a processor. Each of these components may be in communication with one another (for example, via one or more buses).

The receiver 610 may provide a means for receiving information such as packets, user data, control information, or any combination thereof associated with various information channels (for example, control channels, data channels, information channels related to QCL relationship indications for dormant and/or deactivated carriers). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (for example, control channels, data channels, information channels related to QCL relationship indications for dormant and/or deactivated carriers). In some examples, the transmitter 615 may be co-located with a receiver 610 in a transceiver. The transmitter 615 may utilize a single antenna or a set of multiple antennas.

The device 605, or various components thereof, may be an example of means for performing various aspects of QCL relationship indications for dormant and/or deactivated carriers. For example, the communication manager 620 may include a carrier component 625, a first QCL indication component 630, a second QCL indication component 635, or any combination thereof. In some examples, the communication manager 620, or various components thereof, may be configured to perform various operations (for example, receiving, obtaining, monitoring, outputting, transmitting) using or otherwise in cooperation with the receiver 610, the transmitter 615, or both. For example, the communication manager 620 may receive information from the receiver 610, send information to the transmitter 615, or be integrated in combination with the receiver 610, the transmitter 615, or both to obtain information, output information, or perform various other operations.

The communication manager 620 may support wireless communication at a UE (for example, the device 605) in accordance with examples as disclosed herein. The carrier component 625 may be configured as or otherwise support a means for receiving a carrier indication that identifies a first carrier and a second carrier for communication between the UE and a network entity. The first QCL indication component 630 may be configured as or otherwise support a means for receiving, using the first carrier, a first QCL indication that identifies a first set of QCL information that corresponds to a reference signal received using the first carrier. The second QCL indication component 635 may be configured as or otherwise support a means for receiving, using the second carrier, a second QCL indication that identifies the reference signal and that indicates that the first set of QCL information is associated with signaling received using the second carrier.

Figure 7:
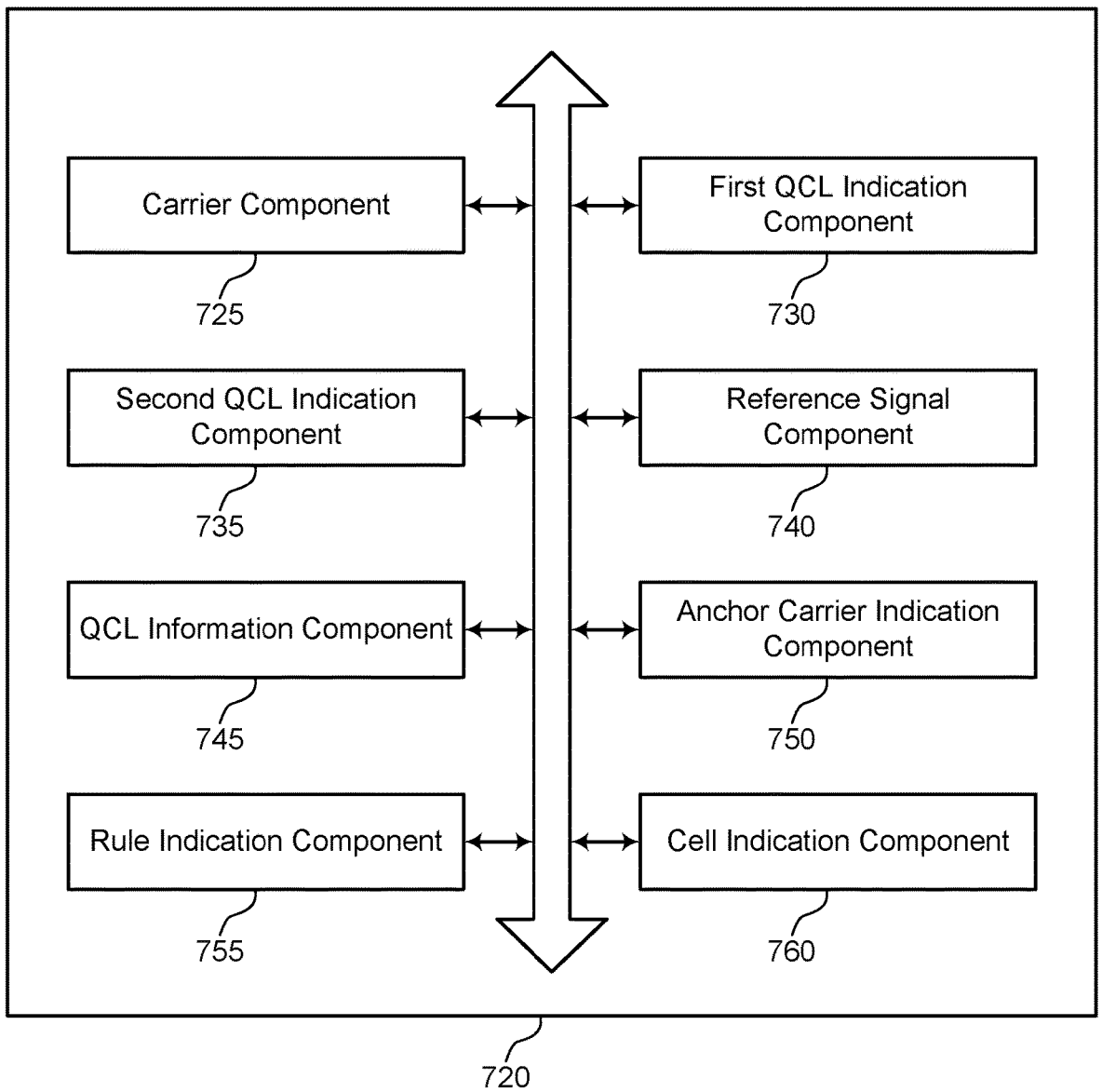
FIG. 7 illustrates a block diagram of a communication manager that supports QCL relationship indications for dormant and/or deactivated carriers in accordance with one or more aspects of the present disclosure.

FIG. 7 illustrates a block diagram of a communication manager 720 that supports QCL relationship indications for dormant and/or deactivated carriers in accordance with one or more aspects of the present disclosure. The communication manager 720 may be an example of aspects of a communication manager 520, a communication manager 620, or both. The communication manager 720, or various components thereof, may be an example of means for performing various aspects of QCL relationship indications for dormant and/or deactivated carriers. For example, the communication manager 720 may include a carrier component 725, a first QCL indication component 730, a second QCL indication component 735, a reference signal component 740, a QCL information component 745, an anchor carrier indication component 750, a rule indication component 755, a cell indication component 760, or any combination thereof. Each of these components may communicate, directly or indirectly, with one another (for example, via one or more buses).

The communication manager 720 may support wireless communication at a UE in accordance with examples as disclosed herein. The carrier component 725 may be configured as or otherwise support a means for receiving a carrier indication that identifies a first carrier and a second carrier for communication between the UE and a network entity. The first QCL indication component 730 may be configured as or otherwise support a means for receiving, using the first carrier, a first QCL indication that identifies a first set of QCL information that corresponds to a reference signal received using the first carrier. The second QCL indication component 735 may be configured as or otherwise support a means for receiving, using the second carrier, a second QCL indication that identifies the reference signal and that indicates that the first set of QCL information is associated with signaling received using the second carrier.

In some examples, the reference signal component 740 may be configured as or otherwise support a means for receiving, using the first carrier, the reference signal. In some examples, the QCL information component 745 may be configured as or otherwise support a means for receiving, using the second carrier, the signaling in accordance with the first set of QCL information and the reference signal.

In some examples, the first set of QCL information identifies a set of QCL parameters common to the reference signal and the signaling. In some examples, the set of QCL parameters is further common to second signaling received using the first carrier.

In some examples, the anchor carrier indication component 750 may be configured as or otherwise support a means for receiving, using the second carrier, an indication that the first carrier is an anchor carrier. In some examples, the second QCL indication is associated with the first carrier being the anchor carrier.

In some examples, the second QCL indication identifies a second set of QCL information that corresponds to a second reference signal received using the second carrier, and the QCL information component 745 may be configured as or otherwise support a means for receiving, using the second carrier, the signaling in accordance with the first set of QCL information or the second set of QCL information.

In some examples, the rule indication component 755 may be configured as or otherwise support a means for receiving, using the second carrier, an indication associated with a rule for selecting QCL information. In some examples, receiving the signaling in accordance with the first set of QCL information or the second set of QCL information is associated with the rule.

In some examples, the cell indication component 760 may be configured as or otherwise support a means for receiving, using the second carrier, a first indication that identifies a cell associated with the second carrier to be activated at the UE. In some examples, the reference signal component 740 may be configured as or otherwise support a means for receiving, using the second carrier, a second indication that identifies the reference signal or the second reference signal.

In some examples, the first set of QCL information identifies a first QCL type associated with intra-band anchor carriers or a second QCL type associated with inter-band anchor carriers. In some examples, the signaling includes a TRS, a CSI-RS, a PDCCH signal, or a PDSCH signal.

Figure 8:
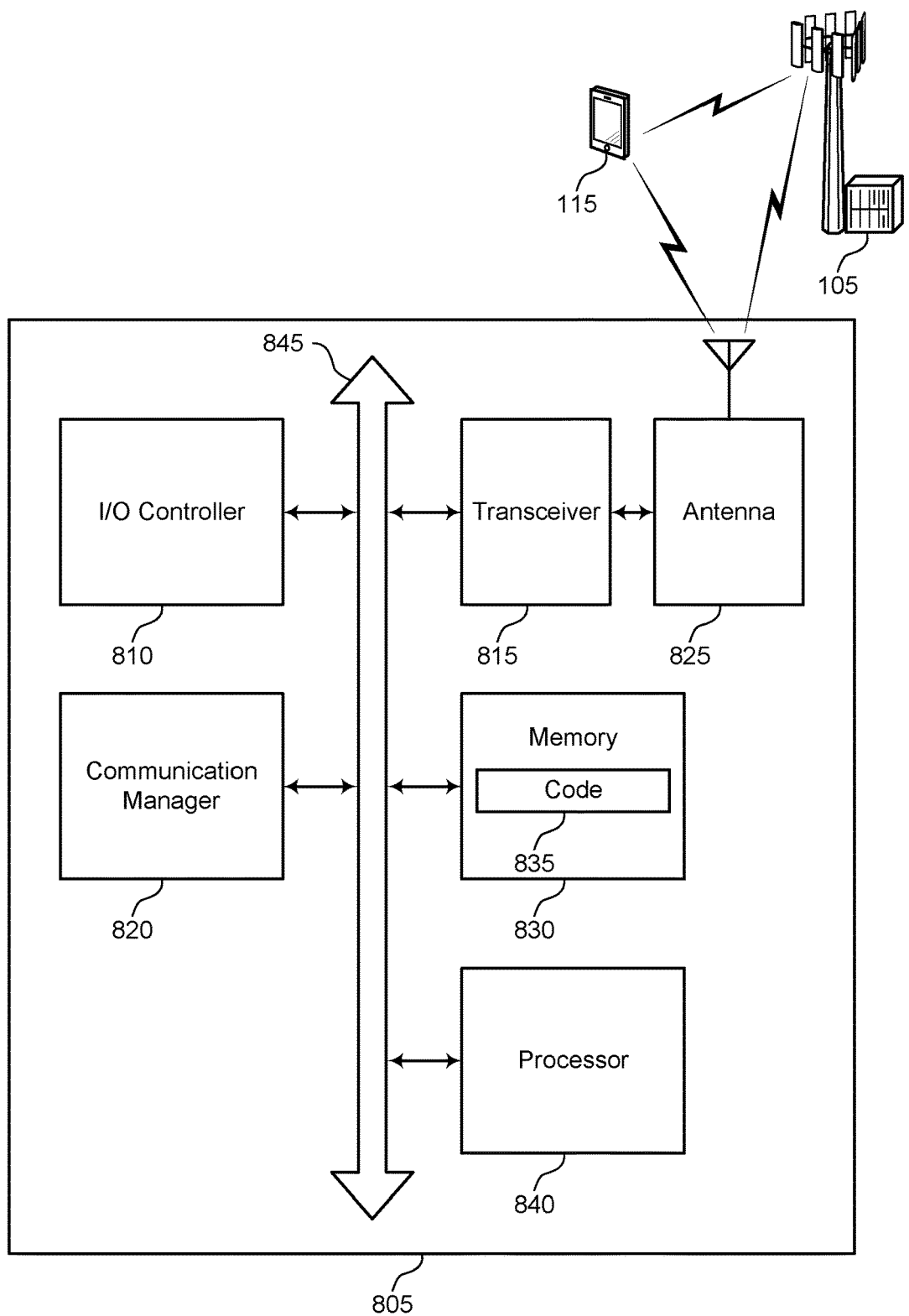
FIG. 8 illustrates a diagram of a system including a device that supports QCL relationship indications for dormant and/or deactivated carriers in accordance with one or more aspects of the present disclosure.

FIG. 8 illustrates a diagram of a system including a device 805 that supports QCL relationship indications for dormant and/or deactivated carriers in accordance with one or more aspects of the present disclosure. The device 805 may be an example of or include the components of a device 505, a device 605, or a UE 115. The device 805 may communicate (for example, wirelessly) with one or more network entities 105, one or more UEs 115, or any combination thereof. The device 805 may include components for bi-directional voice and data communication including components for transmitting and receiving communication, such as a communication manager 820, an input/output (I/O) controller 810, a transceiver 815, an antenna 825, a memory 830, code 835, and a processor 840. These components may be in electronic communication or otherwise coupled (for example, operatively, communicatively, functionally, electronically, electrically) via one or more buses (for example, a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof.

The memory 830 may include random access memory (RAM) and read-only memory (ROM). The memory 830 may store computer-readable, computer-executable code 835 including instructions that, in examples in which the instructions may be executed by the processor 840, cause the device 805 to perform various functions. The code 835 may be stored in a non-transitory computer-readable medium such as system memory or another type of memory. In some cases, the code 835 may not be directly executable by the processor 840 but may cause a computer (for example, such as examples in which the code 835 may be compiled and executed) to perform functions. In some cases, the memory 830 may contain, among other things, a basic I/O system (BIOS), which may control basic hardware or software operation such as the interaction with peripheral components or devices.

The processor 840 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (for example, the memory 830) to cause the device 805 to perform various functions (for example, functions or tasks supporting QCL relationship indications for dormant and/or deactivated carriers). For example, the device 805 or a component of the device 805 may include a processor 840 and memory 830 coupled with or to the processor 840, the processor 840 and memory 830 configured to perform various functions.

The communication manager 820 may support wireless communication at a UE (for example, the device 805) in accordance with examples as disclosed herein. For example, the communication manager 820 may be configured as or otherwise support a means for receiving a carrier indication that identifies a first carrier and a second carrier for communication between the UE and a network entity. The communication manager 820 may be configured as or otherwise support a means for receiving, using the first carrier, a first QCL indication that identifies a first set of QCL information that corresponds to a reference signal received using the first carrier. The communication manager 820 may be configured as or otherwise support a means for receiving, using the second carrier, a second QCL indication that identifies the reference signal and that indicates that the first set of QCL information is associated with signaling received using the second carrier.

By including or configuring the communication manager 820 in accordance with some examples, the device 805 may support techniques for reduced latency, reduced power consumption, and more efficient utilization of communication resources.

In some examples, the communication manager 820 may be configured to perform various operations (for example, receiving, monitoring, transmitting) using or otherwise in cooperation with the transceiver 815, the one or more antennas 825, or any combination thereof. Although the communication manager 820 is illustrated as a separate component, in some examples, one or more functions described with reference to the communication manager 820 may be supported by or performed by the processor 840, the memory 830, the code 835, or any combination thereof. For example, the code 835 may include instructions executable by the processor 840 to cause the device 805 to perform various aspects of QCL relationship indications for dormant and/or deactivated carriers, or the processor 840 and the memory 830 may be otherwise configured to perform or support such operations.

Figure 9:
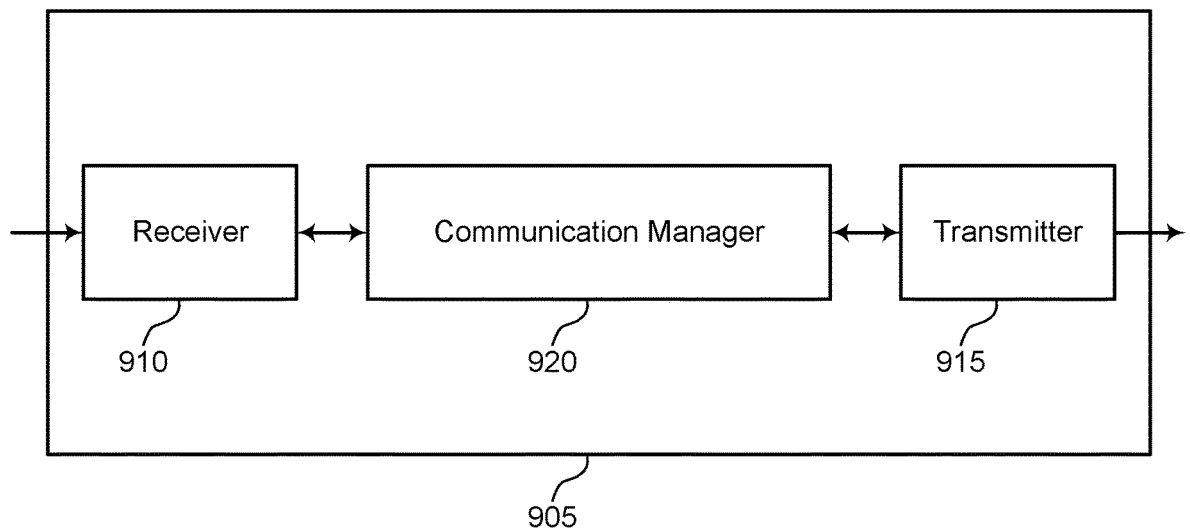
FIGS. 9 and 10 illustrate block diagrams of devices that support QCL relationship indications for dormant and/or deactivated carriers in accordance with one or more aspects of the present disclosure.

FIG. 9 illustrates a block diagram of a device 905 that supports QCL relationship indications for dormant and/or deactivated carriers in accordance with one or more aspects of the present disclosure. The device 905 may be an example of aspects of a network entity 105. The device 905 may include a receiver 910, a transmitter 915, and a communication manager 920. The communication manager 920 can be implemented, at least in part, by one or both of a modem and a processor. Each of these components may be in communication with one another (for example, via one or more buses).

The receiver 910 may provide a means for obtaining (for example, receiving, determining, identifying) information such as user data, control information, or any combination thereof (for example, I/Q samples, symbols, packets, protocol data units, service data units) associated with various channels (for example, control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (for example, electrical, fiber optic) interfaces, wireless interfaces, or any combination thereof.

The transmitter 915 may provide a means for outputting (for example, transmitting, providing, conveying, sending) information generated by other components of the device 905. For example, the transmitter 915 may output information such as user data, control information, or any combination thereof (for example, I/Q samples, symbols, packets, protocol data units, service data units) associated with various channels (for example, control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (for example, electrical, fiber optic) interfaces, wireless interfaces, or any combination thereof. In some examples, the transmitter 915 and the receiver 910 may be co-located in a transceiver, which may include or be coupled with a modem.

The communication manager 920, the receiver 910, the transmitter 915, or various combinations thereof or various components thereof may be examples of means for performing various aspects of QCL relationship indications for dormant and/or deactivated carriers. For example, the communication manager 920, the receiver 910, the transmitter 915, or various combinations or components thereof may support a method for performing one or more functions.

In some examples, the communication manager 920 may be configured to perform various operations (for example, receiving, obtaining, monitoring, outputting, transmitting) using or otherwise in cooperation with the receiver 910, the transmitter 915, or both. For example, the communication manager 920 may receive information from the receiver 910, send information to the transmitter 915, or be integrated in combination with the receiver 910, the transmitter 915, or both to obtain information, output information, or perform various other operations.

The communication manager 920 may support wireless communication at a network entity (for example, the device 905) in accordance with examples as disclosed herein. For example, the communication manager 920 may be configured as or otherwise support a means for outputting a carrier indication that identifies a first carrier and a second carrier for communication between a UE and the network entity. The communication manager 920 may be configured as or otherwise support a means for outputting, using the first carrier, a first QCL indication that identifies a first set of QCL information that corresponds to a reference signal output using the first carrier. The communication manager 920 may be configured as or otherwise support a means for outputting, using the second carrier, a second QCL indication that identifies the reference signal and that indicates that the first set of QCL information is associated with signaling output using the second carrier.

By including or configuring the communication manager 920 in accordance with some examples, the device 905 (for example, a processor controlling or otherwise coupled with the receiver 910, the transmitter 915, the communication manager 920, or a combination thereof) may support techniques for reduced power consumption and more efficient utilization of communication resources.

Figure 10:
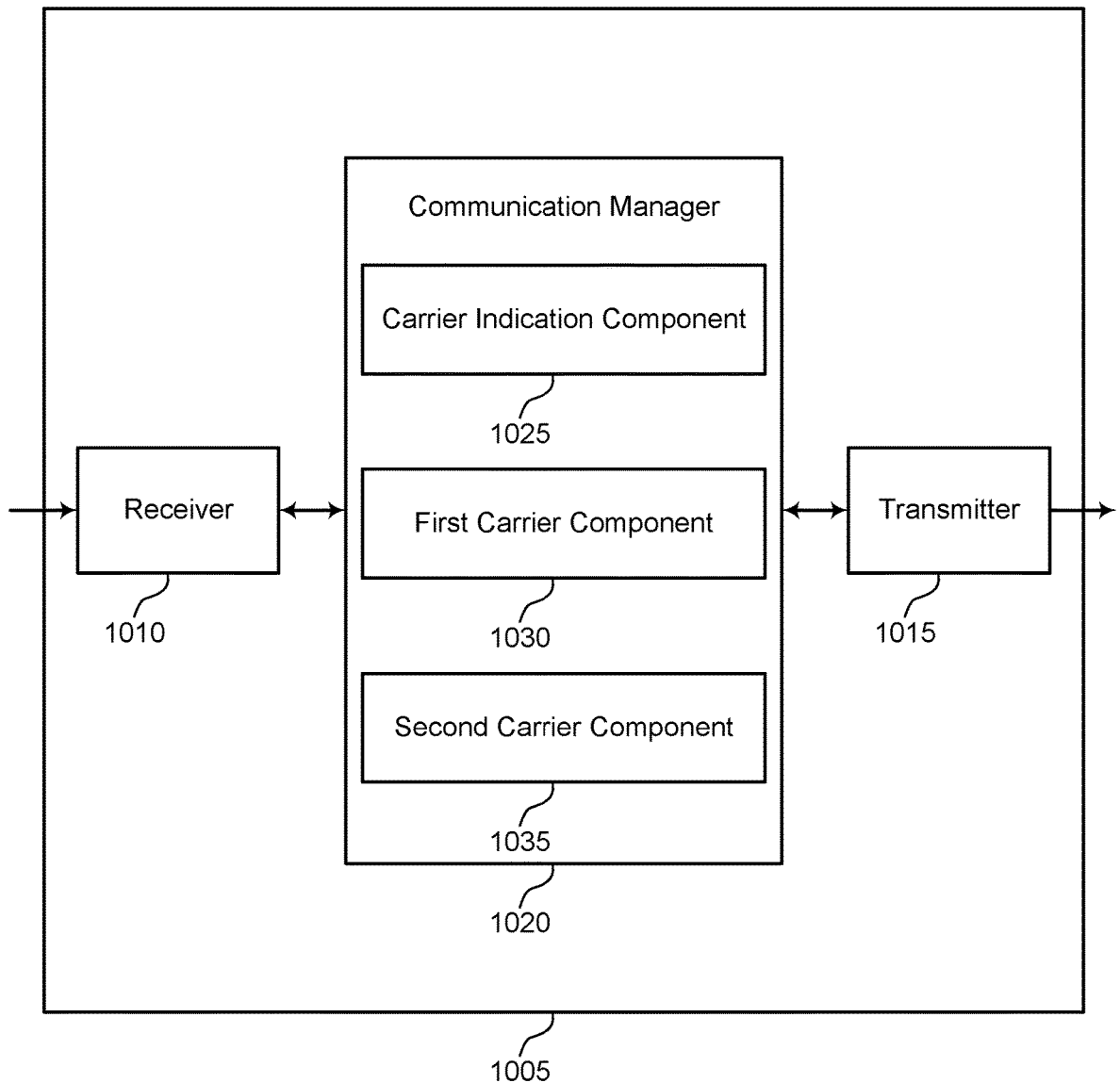

FIG. 10 illustrates a block diagram of a device 1005 that supports QCL relationship indications for dormant and/or deactivated carriers in accordance with one or more aspects of the present disclosure. The device 1005 may be an example of aspects of a device 905 or a network entity 105. The device 1005 may include a receiver 1010, a transmitter 1015, and a communication manager 1020. The communication manager 1020 can be implemented, at least in part, by one or both of a modem and a processor. Each of these components may be in communication with one another (for example, via one or more buses).

The receiver 1010 may provide a means for obtaining (for example, receiving, determining, identifying) information such as user data, control information, or any combination thereof (for example, I/Q samples, symbols, packets, protocol data units, service data units) associated with various channels (for example, control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (for example, electrical, fiber optic) interfaces, wireless interfaces, or any combination thereof.

The transmitter 1015 may provide a means for outputting (for example, transmitting, providing, conveying, sending) information generated by other components of the device 1005. For example, the transmitter 1015 may output information such as user data, control information, or any combination thereof (for example, I/Q samples, symbols, packets, protocol data units, service data units) associated with various channels (for example, control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (for example, electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of QCL relationship indications for dormant and/or deactivated carriers. For example, the communication manager 1020 may include a carrier indication component 1025, a first carrier component 1030, a second carrier component 1035, or any combination thereof. In some examples, the communication manager 1020, or various components thereof, may be configured to perform various operations (for example, receiving, obtaining, monitoring, outputting, transmitting) using or otherwise in cooperation with the receiver 1010, the transmitter 1015, or both. For example, the communication manager 1020 may receive information from the receiver 1010, send information to the transmitter 1015, or be integrated in combination with the receiver 1010, the transmitter 1015, or both to obtain information, output information, or perform various other operations.

The communication manager 1020 may support wireless communication at a network entity (for example, the device 1005) in accordance with examples as disclosed herein. The carrier indication component 1025 may be configured as or otherwise support a means for outputting a carrier indication that identifies a first carrier and a second carrier for communication between a UE and the network entity. The first carrier component 1030 may be configured as or otherwise support a means for outputting, using the first carrier, a first QCL indication that identifies a first set of QCL information that corresponds to a reference signal output using the first carrier. The second carrier component 1035 may be configured as or otherwise support a means for outputting, using the second carrier, a second QCL indication that identifies the reference signal and that indicates that the first set of QCL information is associated with signaling output using the second carrier.

Figure 11:
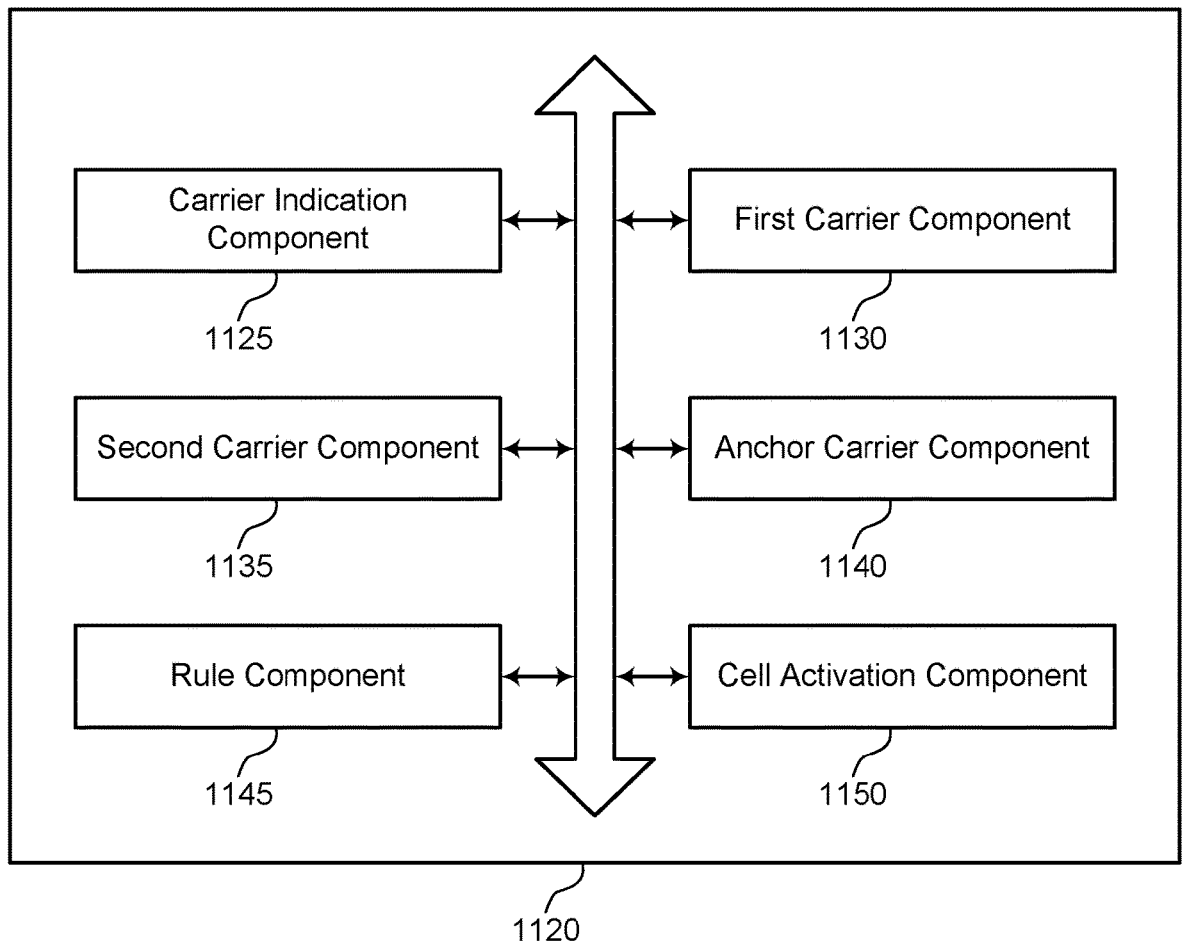
FIG. 11 illustrates a block diagram of a communication manager that supports QCL relationship indications for dormant and/or deactivated carriers in accordance with one or more aspects of the present disclosure.

FIG. 11 illustrates a block diagram of a communication manager 1120 that supports QCL relationship indications for dormant and/or deactivated carriers in accordance with one or more aspects of the present disclosure. The communication manager 1120 may be an example of aspects of a communication manager 920, a communication manager 1020, or both. The communication manager 1120, or various components thereof, may be an example of means for performing various aspects of QCL relationship indications for dormant and/or deactivated carriers. For example, the communication manager 1120 may include a carrier indication component 1125, a first carrier component 1130, a second carrier component 1135, an anchor carrier component 1140, a rule component 1145, a cell activation component 1150, or any combination thereof. Each of these components may communicate, directly or indirectly, with one another (for example, via one or more buses), which may include communication within a protocol layer of a protocol stack, communication associated with a logical channel of a protocol stack (for example, between protocol layers of a protocol stack, within a device, component, or virtualized component associated with a network entity 105, between devices, components, or virtualized components associated with a network entity 105), or any combination thereof.

The communication manager 1120 may support wireless communication at a network entity in accordance with examples as disclosed herein. The carrier indication component 1125 may be configured as or otherwise support a means for outputting a carrier indication that identifies a first carrier and a second carrier for communication between a UE and the network entity. The first carrier component 1130 may be configured as or otherwise support a means for outputting, using the first carrier, a first QCL indication that identifies a first set of QCL information that corresponds to a reference signal output using the first carrier. The second carrier component 1135 may be configured as or otherwise support a means for outputting, using the second carrier, a second QCL indication that identifies the reference signal and that indicates that the first set of QCL information is associated with signaling output using the second carrier.

In some examples, the first carrier component 1130 may be configured as or otherwise support a means for outputting, using the first carrier, the reference signal. In some examples, the second carrier component 1135 may be configured as or otherwise support a means for outputting, using the second carrier, the signaling in accordance with the first set of QCL information and the reference signal.

In some examples, the first set of QCL information identifies a set of QCL parameters common to the reference signal and the signaling. In some examples, the set of QCL parameters is further common to second signaling output using the first carrier.

In some examples, the anchor carrier component 1140 may be configured as or otherwise support a means for outputting, using the second carrier, an indication that the first carrier is an anchor carrier. In some examples, the second QCL indication is associated with the first carrier being the anchor carrier.

In some examples, the second QCL indication identifies a second set of QCL information that corresponds to a second reference signal output using the second carrier, and the second carrier component 1135 may be configured as or otherwise support a means for outputting, using the second carrier, the signaling in accordance with the first set of QCL information or the second set of QCL information.

In some examples, the rule component 1145 may be configured as or otherwise support a means for outputting, using the second carrier, an indication associated with a rule for selecting QCL information. In some examples, outputting the signaling in accordance with the first set of QCL information or the second set of QCL information is associated with the rule.

In some examples, the cell activation component 1150 may be configured as or otherwise support a means for outputting, using the second carrier, a first indication that identifies a cell associated with the second carrier to be activated at the UE. In some examples, the second carrier component 1135 may be configured as or otherwise support a means for outputting, using the second carrier, a second indication that identifies the reference signal or the second reference signal.

In some examples, the first set of QCL information identifies a first QCL type associated with intra-band anchor carriers or a second QCL type associated with inter-based anchor carriers. In some examples, the signaling includes a TRS, a CSI-RS, a PDCCH signal, or a PDSCH signal.

Figure 12:
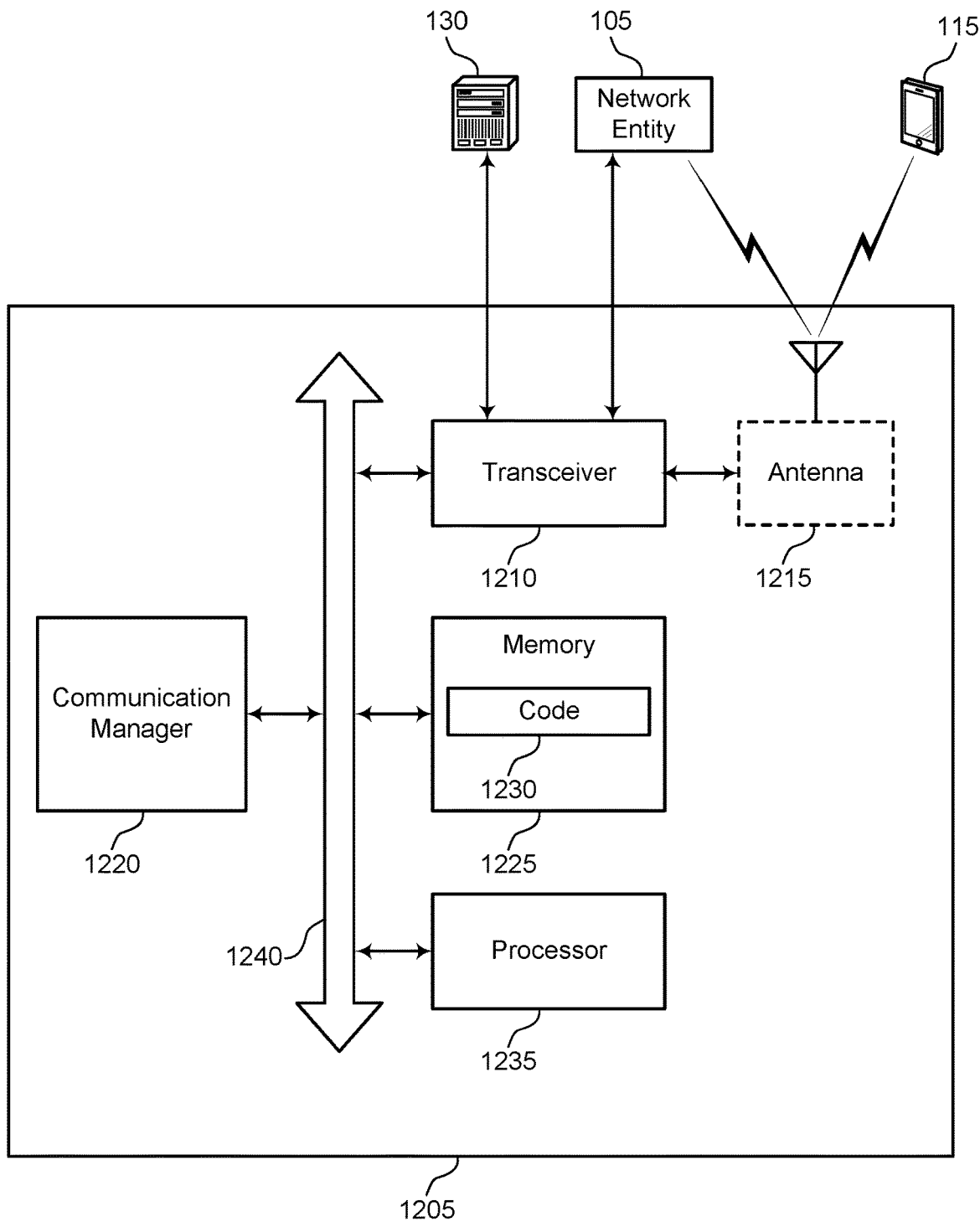
FIG. 12 illustrates a diagram of a system including a device that supports QCL relationship indications for dormant and/or deactivated carriers in accordance with one or more aspects of the present disclosure.

FIG. 12 illustrates a diagram of a system including a device 1205 that supports QCL relationship indications for dormant and/or deactivated carriers in accordance with one or more aspects of the present disclosure. The device 1205 may be an example of or include the components of a device 905, a device 1005, or a network entity 105. The device 1205 may communicate with one or more network entities 105, one or more UEs 115, or any combination thereof, which may include communication over one or more wired interfaces, over one or more wireless interfaces, or any combination thereof. The device 1205 may include components that support outputting and obtaining communication, such as a communication manager 1220, a transceiver 1210, an antenna 1215, a memory 1225, code 1230, and a processor 1235. These components may be in electronic communication or otherwise coupled (for example, operatively, communicatively, functionally, electronically, electrically) via one or more buses (for example, a bus 1240).

The transceiver 1210 may support bi-directional communication via wired links, wireless links, or both. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (for example, concurrently). The transceiver 1210 may also include a modem to modulate signals, to provide the modulated signals for transmission (for example, by one or more antennas 1215, by a wired transmitter), to receive modulated signals (for example, from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communication via one or more communication links (for example, a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, in examples in which the instructions may be executed by the processor 1235, cause the device 1205 to perform various functions. The code 1230 may be stored in a non-transitory computer-readable medium such as system memory or another type of memory. In some cases, the code 1230 may not be directly executable by the processor 1235 but may cause a computer (for example, such as examples in which the code 1230 may be compiled and executed) to perform functions. In some cases, the memory 1225 may contain, among other things, a BIOS, which may control basic hardware or software operation such as the interaction with peripheral components or devices.

The processor 1235 may include an intelligent hardware device (for example, a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (for example, the memory 1225) to cause the device 1205 to perform various functions (for example, functions or tasks supporting QCL relationship indications for dormant and/or deactivated carriers). For example, the device 1205 or a component of the device 1205 may include a processor 1235 and memory 1225 coupled with the processor 1235, the processor 1235 and memory 1225 configured to perform various functions. The processor 1235 may be an example of a cloud-computing platform (for example, one or more physical nodes and supporting software such as operating systems, virtual machines, or container instances) that may host the functions (for example, by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communication manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communication of (for example, within) a protocol layer of a protocol stack. In some examples, a bus 1240 may support communication associated with a logical channel of a protocol stack (for example, between protocol layers of a protocol stack), which may include communication performed within a component of the device 1205, or between different components of the device 1205 that may be co-located or located in different locations (for example, the device 1205 may refer to a system in which one or more of the communication manager 1220, the transceiver 1210, the memory 1225, the code 1230, and the processor 1235 may be located in one of the different components or divided between different components).

In some examples, the communication manager 1220 may manage aspects of communication with a core network 130 (for example, via one or more wired or wireless backhaul links). For example, the communication manager 1220 may manage the transfer of data communication for client devices, such as one or more UEs 115. In some examples, the communication manager 1220 may manage communication with other network entities 105, and may include a controller or scheduler for controlling communication with UEs 115 in cooperation with other network entities 105. In some examples, the communication manager 1220 may support an X2 interface within an LTE/LTE-A wireless communication network technology to provide communication between network entities 105.

The communication manager 1220 may support wireless communication at a network entity (for example, the device 1205) in accordance with examples as disclosed herein. For example, the communication manager 1220 may be configured as or otherwise support a means for outputting a carrier indication that identifies a first carrier and a second carrier for communication between a UE and the network entity. The communication manager 1220 may be configured as or otherwise support a means for outputting, using the first carrier, a first QCL indication that identifies a first set of QCL information that corresponds to a reference signal output using the first carrier. The communication manager 1220 may be configured as or otherwise support a means for outputting, using the second carrier, a second QCL indication that identifies the reference signal and that indicates that the first set of QCL information is associated with signaling output using the second carrier.

By including or configuring the communication manager 1220 in accordance with some examples, the device 1205 may support techniques for reduced latency, reduced power consumption, and more efficient utilization of communication resources.

In some examples, the communication manager 1220 may be configured to perform various operations (for example, receiving, obtaining, monitoring, outputting, transmitting) using or otherwise in cooperation with the transceiver 1210, the one or more antennas 1215 (for example, such as examples in which the antennas 1215 may be applicable), or any combination thereof. Although the communication manager 1220 is illustrated as a separate component, in some examples, one or more functions described with reference to the communication manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of QCL relationship indications for dormant and/or deactivated carriers, or the processor 1235 and the memory 1225 may be otherwise configured to perform or support such operations.

Figure 13:
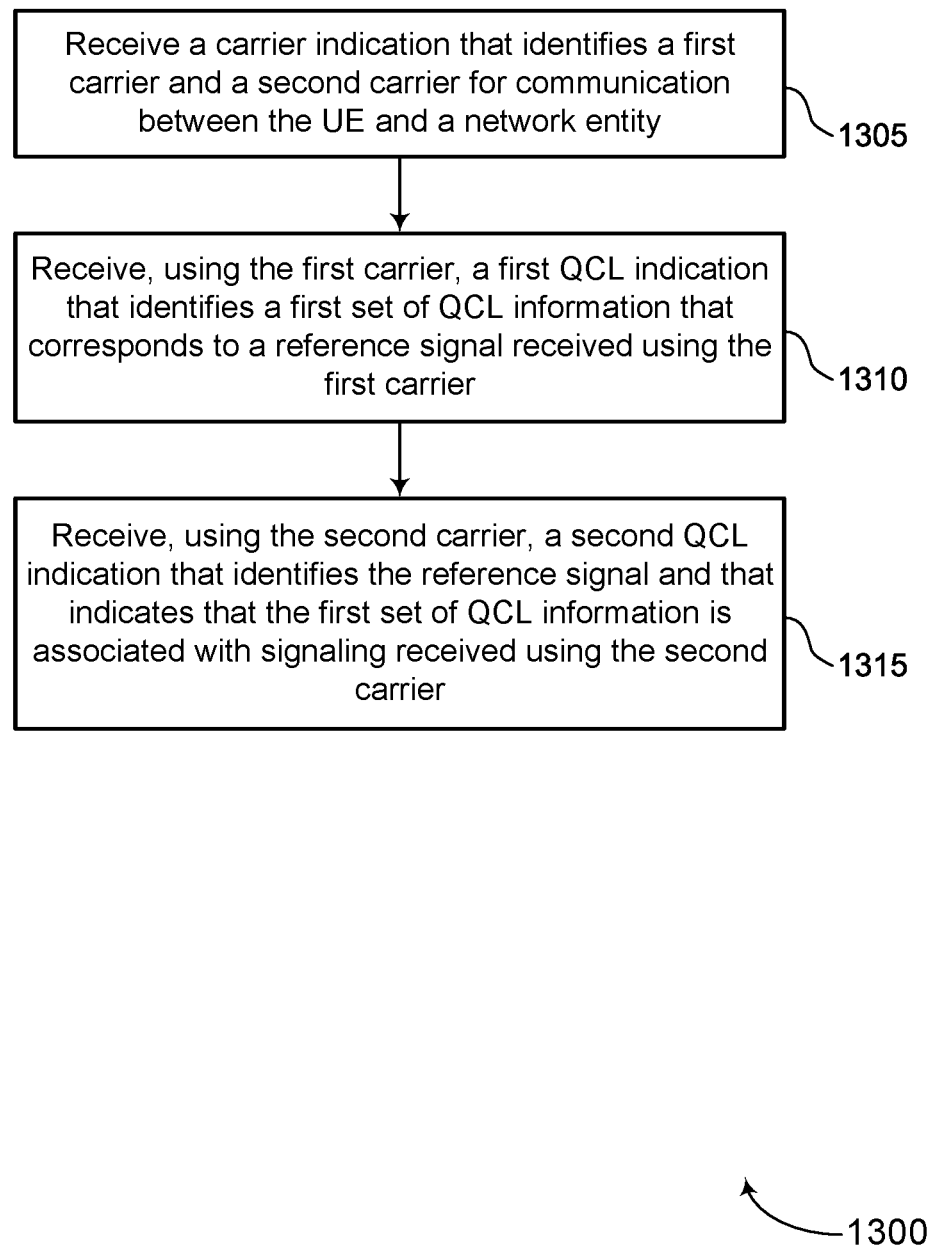
FIGS. 13 through 16 illustrate flowcharts showing methods that support QCL relationship indications for dormant and/or deactivated carriers in accordance with one or more aspects of the present disclosure.

FIG. 13 illustrates a flowchart showing a method 1300 that supports QCL relationship indications for dormant and/or deactivated carriers in accordance with one or more aspects of the present disclosure. The operations of the method 1300 may be implemented by a UE or its components. For example, the operations of the method 1300 may be performed by a UE 115 as described with reference to FIGS. 1-8. In some examples, a UE may execute a set of instructions to control the functional elements of the UE to perform the described functions. Additionally, or alternatively, the UE may perform aspects of the described functions using special-purpose hardware.

At 1305, the method may include receiving a carrier indication that identifies a first carrier and a second carrier for communication between the UE and a network entity. The operations of 1305 may be performed in accordance with examples as disclosed herein. In some examples, aspects of the operations of 1305 may be performed by a carrier component 725 as described with reference to FIG. 7.

At 1310, the method may include receiving, using the first carrier, a first QCL indication that identifies a first set of QCL information that corresponds to a reference signal received using the first carrier. The operations of 1310 may be performed in accordance with examples as disclosed herein. In some examples, aspects of the operations of 1310 may be performed by a first QCL indication component 730 as described with reference to FIG. 7.

At 1315, the method may include receiving, using the second carrier, a second QCL indication that identifies the reference signal and that indicates that the first set of QCL information is associated with signaling received using the second carrier. The operations of 1315 may be performed in accordance with examples as disclosed herein. In some examples, aspects of the operations of 1315 may be performed by a second QCL indication component 735 as described with reference to FIG. 7.

Figure 14:
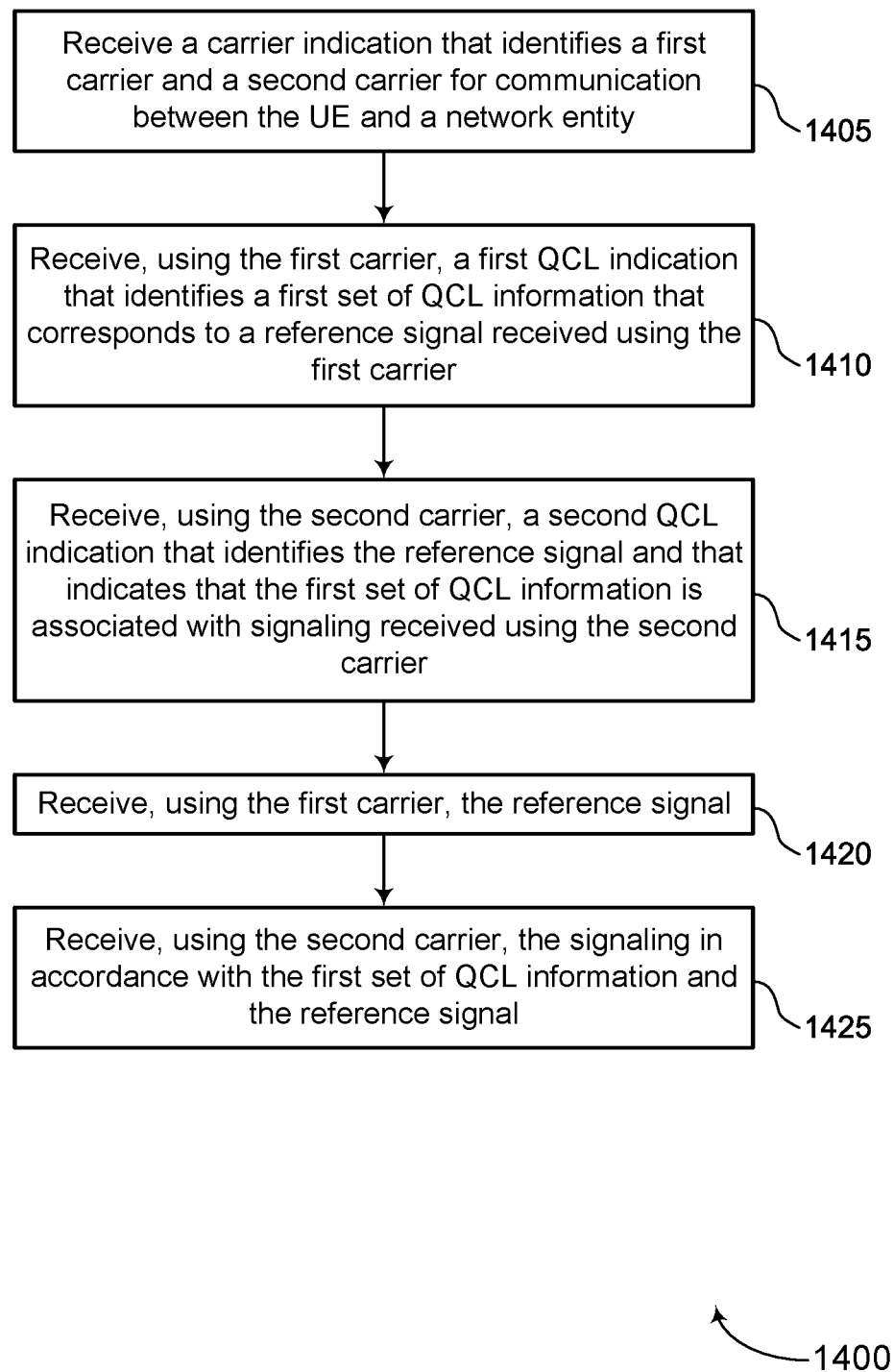

FIG. 14 illustrates a flowchart showing a method 1400 that supports QCL relationship indications for dormant and/or deactivated carriers in accordance with one or more aspects of the present disclosure. The operations of the method 1400 may be implemented by a UE or its components. For example, the operations of the method 1400 may be performed by a UE 115 as described with reference to FIGS. 1-8. In some examples, a UE may execute a set of instructions to control the functional elements of the UE to perform the described functions. Additionally, or alternatively, the UE may perform aspects of the described functions using special-purpose hardware.

At 1405, the method may include receiving a carrier indication that identifies a first carrier and a second carrier for communication between the UE and a network entity. The operations of 1405 may be performed in accordance with examples as disclosed herein. In some examples, aspects of the operations of 1405 may be performed by a carrier component 725 as described with reference to FIG. 7.

At 1410, the method may include receiving, using the first carrier, a first QCL indication that identifies a first set of QCL information that corresponds to a reference signal received using the first carrier. The operations of 1410 may be performed in accordance with examples as disclosed herein. In some examples, aspects of the operations of 1410 may be performed by a first QCL indication component 730 as described with reference to FIG. 7.

At 1415, the method may include receiving, using the second carrier, a second QCL indication that identifies the reference signal and that indicates that the first set of QCL information is associated with signaling received using the second carrier. The operations of 1415 may be performed in accordance with examples as disclosed herein. In some examples, aspects of the operations of 1415 may be performed by a second QCL indication component 735 as described with reference to FIG. 7.

At 1420, the method may include receiving, using the first carrier, the reference signal. The operations of 1420 may be performed in accordance with examples as disclosed herein. In some examples, aspects of the operations of 1420 may be performed by a reference signal component 740 as described with reference to FIG. 7.

At 1425, the method may include receiving, using the second carrier, the signaling in accordance with the first set of QCL information and the reference signal. The operations of 1425 may be performed in accordance with examples as disclosed herein. In some examples, aspects of the operations of 1425 may be performed by a QCL information component 745 as described with reference to FIG. 7.

Figure 15:
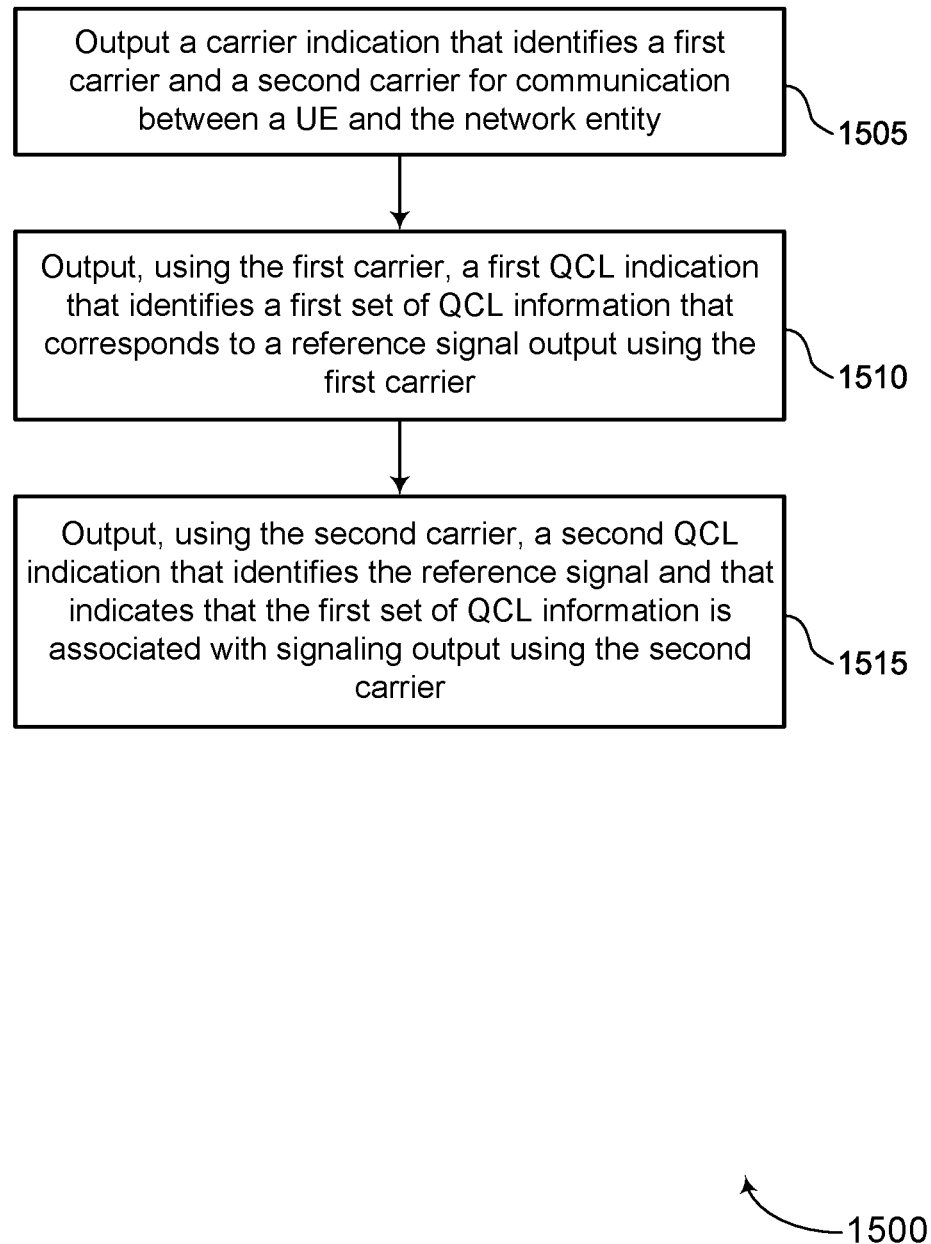

FIG. 15 illustrates a flowchart showing a method 1500 that supports QCL relationship indications for dormant and/or deactivated carriers in accordance with one or more aspects of the present disclosure. The operations of the method 1500 may be implemented by a network entity or its components. For example, the operations of the method 1500 may be performed by a network entity as described with reference to FIGS. 1-4 and 9-12. In some examples, a network entity may execute a set of instructions to control the functional elements of the network entity to perform the described functions. Additionally, or alternatively, the network entity may perform aspects of the described functions using special-purpose hardware.

At 1505, the method may include outputting a carrier indication that identifies a first carrier and a second carrier for communication between a UE and the network entity. The operations of 1505 may be performed in accordance with examples as disclosed herein. In some examples, aspects of the operations of 1505 may be performed by a carrier indication component 1125 as described with reference to FIG. 11.

At 1510, the method may include outputting, using the first carrier, a first QCL indication that identifies a first set of QCL information that corresponds to a reference signal output using the first carrier. The operations of 1510 may be performed in accordance with examples as disclosed herein. In some examples, aspects of the operations of 1510 may be performed by a first carrier component 1130 as described with reference to FIG. 11.

At 1515, the method may include outputting, using the second carrier, a second QCL indication that identifies the reference signal and that indicates that the first set of QCL information is associated with signaling output using the second carrier. The operations of 1515 may be performed in accordance with examples as disclosed herein. In some examples, aspects of the operations of 1515 may be performed by a second carrier component 1135 as described with reference to FIG. 11.

Figure 16:
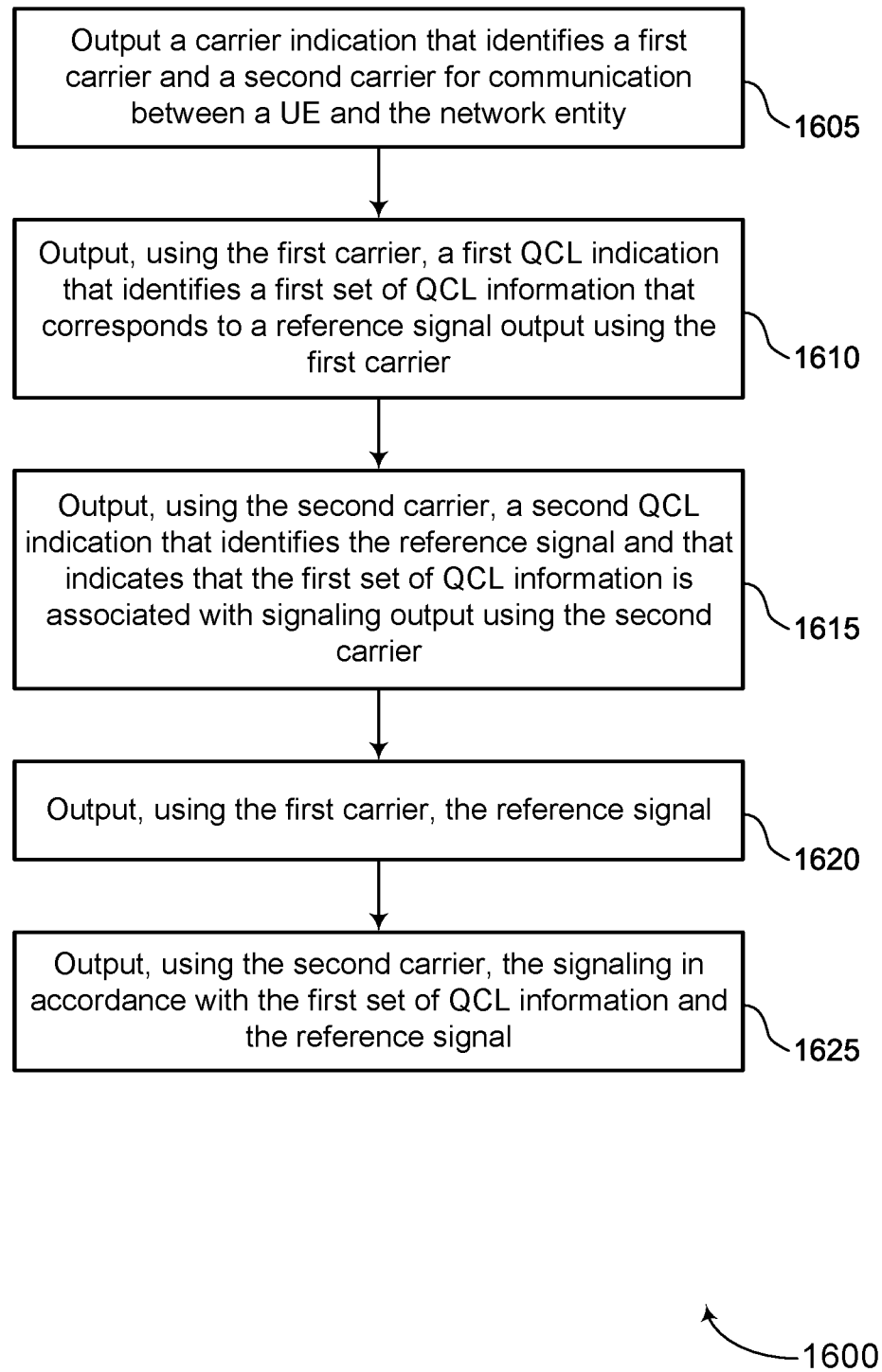

FIG. 16 illustrates a flowchart showing a method 1600 that supports QCL relationship indications for dormant and/or deactivated carriers in accordance with one or more aspects of the present disclosure. The operations of the method 1600 may be implemented by a network entity or its components. For example, the operations of the method 1600 may be performed by a network entity as described with reference to FIGS. 1-4 and 9-12. In some examples, a network entity may execute a set of instructions to control the functional elements of the network entity to perform the described functions. Additionally, or alternatively, the network entity may perform aspects of the described functions using special-purpose hardware.

At 1605, the method may include outputting a carrier indication that identifies a first carrier and a second carrier for communication between a UE and the network entity. The operations of 1605 may be performed in accordance with examples as disclosed herein. In some examples, aspects of the operations of 1605 may be performed by a carrier indication component 1125 as described with reference to FIG. 11.

At 1610, the method may include outputting, using the first carrier, a first QCL indication that identifies a first set of QCL information that corresponds to a reference signal output using the first carrier. The operations of 1610 may be performed in accordance with examples as disclosed herein. In some examples, aspects of the operations of 1610 may be performed by a first carrier component 1130 as described with reference to FIG. 11.

At 1615, the method may include outputting, using the second carrier, a second QCL indication that identifies the reference signal and that indicates that the first set of QCL information is associated with signaling output using the second carrier. The operations of 1615 may be performed in accordance with examples as disclosed herein. In some examples, aspects of the operations of 1615 may be performed by a second carrier component 1135 as described with reference to FIG. 11.

At 1620, the method may include outputting, using the first carrier, the reference signal. The operations of 1620 may be performed in accordance with examples as disclosed herein. In some examples, aspects of the operations of 1620 may be performed by a first carrier component 1130 as described with reference to FIG. 11.

At 1625, the method may include outputting, using the second carrier, the signaling in accordance with the first set of QCL information and the reference signal. The operations of 1625 may be performed in accordance with examples as disclosed herein. In some examples, aspects of the operations of 1625 may be performed by a second carrier component 1135 as described with reference to FIG. 11.

The following provides an overview of aspects of the present disclosure:

Aspect 1: A method for wireless communication at a UE, comprising: receiving a carrier indication that identifies a first carrier and a second carrier for communication between the UE and a network entity; receiving, using the first carrier, a first QCL indication that identifies a first set of QCL information that corresponds to a reference signal received using the first carrier; and receiving, using the second carrier, a second QCL indication that identifies the reference signal and that indicates that the first set of QCL information is associated with signaling received using the second carrier.

Aspect 2: The method of aspect 1, further comprising: receiving, using the first carrier, the reference signal; and receiving, using the second carrier, the signaling in accordance with the first set of QCL information and the reference signal.

Aspect 3: The method of aspect 2, wherein the first set of QCL information identifies a set of QCL parameters common to the reference signal and the signaling.

Aspect 4: The method of aspect 3, wherein the set of QCL parameters is further common to second signaling received using the first carrier.

Aspect 5: The method of any of aspects 1 through 4, further comprising: receiving, using the second carrier, an indication that the first carrier is an anchor carrier, wherein the second QCL indication is associated with the first carrier being the anchor carrier.

Aspect 6: The method of any of aspects 1 through 5, wherein the second QCL indication identifies a second set of QCL information that corresponds to a second reference signal received using the second carrier, the method further comprising: receiving, using the second carrier, the signaling in accordance with the first set of QCL information or the second set of QCL information.

Aspect 7: The method of aspect 6, further comprising: receiving, using the second carrier, an indication associated with a rule for selecting QCL information, wherein receiving the signaling in accordance with the first set of QCL information or the second set of QCL information is associated with the rule.

Aspect 8: The method of aspect 6, further comprising: receiving, using the second carrier, a first indication that identifies a cell associated with the second carrier to be activated at the UE.

Aspect 9: The method of aspect 8, further comprising: receiving, using the second carrier, a second indication that identifies the reference signal or the second reference signal.

Aspect 10: The method of any of aspects 1 through 9, wherein the first set of QCL information identifies a first QCL type associated with intra-band anchor carriers or a second QCL type associated with inter-band anchor carriers.

Aspect 11: The method of any of aspects 1 through 10, wherein the signaling comprises a TRS, a CSI-RS, a PDCCH signal, or a PDSCH signal.

Aspect 12: A method for wireless communication at a network entity, comprising: outputting a carrier indication that identifies a first carrier and a second carrier for communication between a UE and the network entity; outputting, using the first carrier, a first QCL indication that identifies a first set of QCL information that corresponds to a reference signal output using the first carrier; and outputting, using the second carrier, a second QCL indication that identifies the reference signal and that indicates that the first set of QCL information is associated with signaling output using the second carrier.

Aspect 13: The method of aspect 12, further comprising: outputting, using the first carrier, the reference signal; and outputting, using the second carrier, the signaling in accordance with the first set of QCL information and the reference signal.

Aspect 14: The method of aspect 13, wherein the first set of QCL information identifies a set of QCL parameters common to the reference signal and the signaling.

Aspect 15: The method of aspect 14, wherein the set of QCL parameters is further common to second signaling output using the first carrier.

Aspect 16: The method of any of aspects 12 through 15, further comprising: outputting, using the second carrier, an indication that the first carrier as an anchor carrier, wherein the second QCL indication is associated with the first carrier being used as the anchor carrier.

Aspect 17: The method of any of aspects 12 through 16, wherein the second QCL indication identifies a second set of QCL information that corresponds to a second reference signal output using the second carrier, the method further comprising: outputting, using the second carrier, the signaling in accordance with the first set of QCL information or the second set of QCL information.

Aspect 18: The method of aspect 17, further comprising: outputting, using the second carrier, an indication associated with a rule for selecting QCL information, wherein outputting the signaling in accordance with the first set of QCL information or the second set of QCL information is associated with the rule.

Aspect 19: The method of aspect 17, further comprising: outputting, using the second carrier, a first indication that identifies a cell associated with the second carrier to be activated at the UE.

Aspect 20: The method of aspect 19, further comprising: outputting, using the second carrier, a second indication that identifies the reference signal or the second reference signal.

Aspect 21: The method of any of aspects 12 through 20, wherein the first set of QCL information identifies a first QCL type associated with intra-band anchor carriers or a second QCL type associated with inter-based anchor carriers.

Aspect 22: The method of any of aspects 12 through 21, wherein the signaling comprises a TRS, a CSI-RS, a PDCCH signal, or a PDSCH signal.

Aspect 23: An apparatus for wireless communication at a UE, comprising a processor; and memory coupled with the processor and storing instructions executable by the processor to cause the apparatus to perform a method of any of aspects 1 through 11.

Aspect 24: An apparatus for wireless communication at a UE, comprising at least one means for performing a method of any of aspects 1 through 11.

Aspect 25: A non-transitory computer-readable medium storing code for wireless communication at a UE, the code comprising instructions executable by a processor to perform a method of any of aspects 1 through 11.

Aspect 26: An apparatus for wireless communication at a network entity, comprising a processor; and memory coupled with the processor and storing and instructions executable by the processor to cause the apparatus to perform a method of any of aspects 12 through 22.

Aspect 27: An apparatus for wireless communication at a network entity, comprising at least one means for performing a method of any of aspects 12 through 22.

Aspect 28: A non-transitory computer-readable medium storing code for wireless communication at a network entity, the code comprising instructions executable by a processor to perform a method of any of aspects 12 through 22.

It may be noted that the methods described in this disclosure describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described in this disclosure are applicable beyond LTE, LTE-A, LTE-A Pro, or NR networks. For example, the described techniques may be applicable to various other wireless communication systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described in this disclosure may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform functions described in this disclosure. A general-purpose processor may be a microprocessor but, in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described in this disclosure may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described in this disclosure may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (in other words, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, "determining" can include calculating, computing, processing, deriving, investigating, looking up (such as via looking up in a table, a database or another data structure), ascertaining, among other examples. Also, "determining" can include receiving (for example, receiving information), accessing (for example, accessing data stored in memory), among other examples. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. The disclosure is not limited to the examples and designs described in this disclosure but is to be accorded the broadest scope consistent with the principles and novel features disclosed herein.

What is claimed is:

1. A method for wireless communication at a user equipment (UE), comprising:
receiving a carrier indication that identifies a first carrier and a second carrier for communication between the UE and a network entity;
receiving, using the first carrier, a first quasi co-location indication that identifies a first set of quasi co-location information that corresponds to a reference signal received using the first carrier; and
receiving, using the second carrier, an indication that the first carrier is an anchor carrier and a second quasi co-location indication that comprises a cell identifier of the first carrier and identifies the reference signal received using the first carrier, the second quasi co-location indication indicating the first set of quasi co-location information for signaling over the second carrier in accordance with the first carrier being the anchor carrier.

2. The method of claim 1, further comprising:
receiving, using the first carrier, the reference signal; and
receiving, using the second carrier, the signaling in accordance with the first set of quasi co-location information and the reference signal.

3. The method of claim 2, wherein the first set of quasi co-location information identifies a set of quasi co-location parameters common to the reference signal and the signaling.

4. The method of claim 3, wherein the set of quasi co-location parameters is further common to second signaling received using the first carrier.

5. The method of claim 1, wherein the second quasi co-location indication identifies a second set of quasi co-location information that corresponds to a second reference signal received using the second carrier, the method further comprising receiving, using the second carrier, the signaling in accordance with the first set of quasi co-location information or the second set of quasi co-location information.

6. The method of claim 5, further comprising receiving, using the second carrier, an indication associated with a rule for selecting quasi co-location information, wherein receiving the signaling in accordance with the first set of quasi co-location information or the second set of quasi co-location information is associated with the rule.

7. The method of claim 5, further comprising receiving, using the second carrier, a first indication that identifies a cell associated with the second carrier to be activated at the UE.

8. The method of claim 7, further comprising receiving, using the second carrier, a second indication that identifies the reference signal or the second reference signal.

9. The method of claim 1, wherein the first set of quasi co-location information identifies a first quasi co-location type associated with intra-band anchor carriers or a second quasi co-location type associated with inter-band anchor carriers.

10. The method of claim 1, wherein the signaling comprises a tracking reference signal, a channel state information reference signal, a physical downlink control channel signal, or a physical downlink shared channel signal.

11. A method for wireless communication at a network entity, comprising:

outputting a carrier indication that identifies a first carrier and a second carrier for communication between a user equipment (UE) and the network entity;
outputting, using the first carrier, a first quasi co-location indication that identifies a first set of quasi co-location information that corresponds to a reference signal output using the first carrier; and
outputting, using the second carrier, an indication that the first carrier is an anchor carrier and a second quasi co-location indication that comprises a cell identifier of the first carrier and identifies the reference signal output using the first carrier, the second quasi co-location indication indicating the first set of quasi co-location information for signaling over the second carrier in accordance with the first carrier being the anchor carrier.

12. The method of claim 11, further comprising:
outputting, using the first carrier, the reference signal; and
outputting, using the second carrier, the signaling in accordance with the first set of quasi co-location information and the reference signal.

13. The method of claim 12, wherein the first set of quasi co-location information identifies a set of quasi co-location parameters common to the reference signal and the signaling.

14. The method of claim 13, wherein the set of quasi co-location parameters is further common to second signaling output using the first carrier.

15. The method of claim 11, wherein the second quasi co-location indication identifies a second set of quasi co-location information that corresponds to a second reference signal output using the second carrier, the method further comprising outputting, using the second carrier, the signaling in accordance with the first set of quasi co-location information or the second set of quasi co-location information.

16. The method of claim 15, further comprising outputting, using the second carrier, an indication associated with a rule for selecting quasi co-location information, wherein outputting the signaling in accordance with the first set of quasi co-location information or the second set of quasi co-location information is associated with the rule.

17. The method of claim 15, further comprising outputting, using the second carrier, a first indication that identifies a cell associated with the second carrier to be activated at the UE.

18. The method of claim 17, further comprising outputting, using the second carrier, a second indication that identifies the reference signal or the second reference signal.

19. The method of claim 11, wherein the first set of quasi co-location information identifies a first quasi co-location type associated with intra-band anchor carriers or a second quasi co-location type associated with inter-based anchor carriers.

20. The method of claim 11, wherein the signaling comprises a tracking reference signal, a channel state information reference signal, a physical downlink control channel signal, or a physical downlink shared channel signal.

21. An apparatus for wireless communication at a user equipment (UE), comprising:
at least one processor; and
at least one memory coupled with the at least one processor and storing instructions executable by the at least one processor to cause the apparatus to:
receive a carrier indication that identifies a first carrier and a second carrier for communication between the UE and a network entity;

receive, using the first carrier, a first quasi co-location indication that identifies a first set of quasi co-location information that corresponds to a reference signal received using the first carrier; and receive, using the second carrier, an indication that the first carrier is an anchor carrier and a second quasi co-location indication that comprises a cell identifier of the first carrier and identifies the reference signal received using the first carrier, the second quasi co-location indication indicating the first set of quasi co-location information for signaling over the second carrier in accordance with the first carrier being the anchor carrier.

22. The apparatus of claim 21, wherein the instructions are further executable by the at least one processor to cause the apparatus to:

receive, using the first carrier, the reference signal; and receive, using the second carrier, the signaling in accordance with the first set of quasi co-location information and the reference signal.

23. The apparatus of claim 21, wherein the second quasi co-location indication identifies a second set of quasi co-location information that corresponds to a second reference signal received using the second carrier, and the instructions are further executable by the at least one processor to cause the apparatus to receive, using the second carrier, the signaling in accordance with the first set of quasi co-location information or the second set of quasi co-location information.

24. An apparatus for wireless communication at a network entity, comprising:

at least one processor; and at least one memory coupled with the at least one processor and storing instructions executable by the at least one processor to cause the apparatus to:

output a carrier indication that identifies a first carrier and a second carrier for communication between a user equipment (UE) and the network entity;

output, using the first carrier, a first quasi co-location indication that identifies a first set of quasi co-location information that corresponds to a reference signal output using the first carrier; and output, using the second carrier, an indication that the first carrier is an anchor carrier and a second quasi co-location indication that comprises a cell identifier of the first carrier and identifies the reference signal output using the first carrier, the second quasi co-location indication indicating the first set of quasi co-location information for signaling over the second carrier in accordance with the first carrier being the anchor carrier.

25. The apparatus of claim 24, wherein the instructions are further executable by the at least one processor to cause the apparatus to:

output, using the first carrier, the reference signal; and output, using the second carrier, the signaling in accordance with the first set of quasi co-location information and the reference signal.

26. The apparatus of claim 24, wherein the second quasi co-location indication identifies a second set of quasi co-location information that corresponds to a second reference signal output using the second carrier, and the instructions are further executable by the at least one processor to cause the apparatus to output, using the second carrier, the signaling in accordance with the first set of quasi co-location information or the second set of quasi co-location information.

* * * * *